US008483196B2

(12) United States Patent
Wang et al.

(10) Patent No.: US 8,483,196 B2
(45) Date of Patent: Jul. 9, 2013

(54) METHODS AND APPARATUS FOR SUPPORTING SYNCHRONIZATION BETWEEN GROUPS OF DEVICES

(75) Inventors: Hua Wang, Bridgewater, NJ (US); Sanjay Shakkottai, Austin, TX (US); Xinzhou Wu, Monmouth Junction, NJ (US); Junyi Li, Chester, NJ (US); Aleksandar Jovicic, Jersey City, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 396 days.

(21) Appl. No.: 12/722,595

(22) Filed: Mar. 12, 2010

(65) Prior Publication Data

US 2011/0222515 A1    Sep. 15, 2011

(51) Int. Cl.
*H04W 4/00*     (2009.01)

(52) U.S. Cl.
USPC ........................................................ 370/338

(58) Field of Classification Search
USPC ......... 370/203, 204–215, 229–253, 310–337, 370/338–350, 395.1, 395.3, 395.4, 395.41, 370/395.42, 395.5, 395.52, 395.53, 412–421, 370/431–529, 523–520
See application file for complete search history.

(56) References Cited

U.S. PATENT DOCUMENTS

| | | | | |
|---|---|---|---|---|
| 7,260,100 | B1 * | 8/2007 | Snodgrass | 370/400 |
| 8,064,909 | B2 * | 11/2011 | Spinelli et al. | 455/436 |
| 2005/0190784 | A1 * | 9/2005 | Stine | 370/445 |
| 2009/0067370 | A1 * | 3/2009 | Kim et al. | 370/328 |
| 2009/0129342 | A1 * | 5/2009 | Hwang et al. | 370/331 |
| 2009/0156213 | A1 * | 6/2009 | Spinelli et al. | 455/436 |
| 2009/0279522 | A1 * | 11/2009 | Leroy et al. | 370/338 |
| 2009/0286510 | A1 * | 11/2009 | Huber et al. | 455/410 |
| 2009/0299788 | A1 * | 12/2009 | Huber et al. | 705/7 |
| 2009/0318124 | A1 * | 12/2009 | Haughn | 455/418 |
| 2010/0002663 | A1 * | 1/2010 | Shinozaki | 370/338 |

(Continued)

FOREIGN PATENT DOCUMENTS

| | | |
|---|---|---|
| EP | 2046000 A1 | 4/2009 |
| WO | WO0101635 A1 | 1/2001 |

OTHER PUBLICATIONS

Bluetooth Specificaton Version 1.0 B, Core, Bluetooth Specificaton Version, XX, XX, vol. 1, Dec. 1, 1999, pp. 95-126, XP002174708.

(Continued)

*Primary Examiner* — Jung-Jen Liu
(74) *Attorney, Agent, or Firm* — Paul S. Holdaway

(57) ABSTRACT

Methods and apparatus related to supporting rapid synchronization between groups of wireless communications devices are described. Described methods and apparatus are well suited for use in peer to peer wireless communications systems in which a plurality of ad hoc peer to peer networks may be formed, each ad hoc network operating with its own notion of time. As two groups of devices, having different notions of time, come within proximity of one another, a wireless communications device of a first group detects the presence of a member of a second group. The wireless device determines that network timing re-synchronization is to be performed by one of the first and second groups and transmits a re-synchronization alert signal on a dedicated resource. Subsequently, the wireless device transmits a timing synchronization signal in accordance with new timing. Intended devices, which detect the alert signal and timing synchronization signal, adjust their internal timing.

24 Claims, 14 Drawing Sheets

U.S. PATENT DOCUMENTS

| | | | |
|---|---|---|---|
| 2010/0027521 A1* | 2/2010 | Huber et al. | 370/338 |
| 2010/0074187 A1* | 3/2010 | Sun et al. | 370/329 |
| 2010/0128694 A1* | 5/2010 | Choi-Grogan | 370/331 |
| 2010/0128697 A1* | 5/2010 | Choi-Grogan | 370/332 |
| 2010/0130171 A1* | 5/2010 | Palanigounder et al. | 455/411 |
| 2010/0165960 A1* | 7/2010 | Richardson | 370/338 |
| 2010/0254334 A1* | 10/2010 | Lin et al. | 370/329 |
| 2010/0272021 A1* | 10/2010 | Kopplin et al. | 370/328 |
| 2011/0075557 A1* | 3/2011 | Chowdhury et al. | 370/230 |
| 2011/0116379 A1* | 5/2011 | Shousterman et al. | 370/235 |
| 2011/0170517 A1* | 7/2011 | Bakker et al. | 370/331 |
| 2011/0171953 A1* | 7/2011 | Faccin et al. | 455/426.1 |
| 2011/0306332 A1* | 12/2011 | Macpherson | 455/419 |
| 2012/0044908 A1* | 2/2012 | Spinelli et al. | 370/331 |

OTHER PUBLICATIONS

International Search Report and Written Opinion—PCT/US2011/027750, ISA/EPO—Jun. 30, 2011.

* cited by examiner

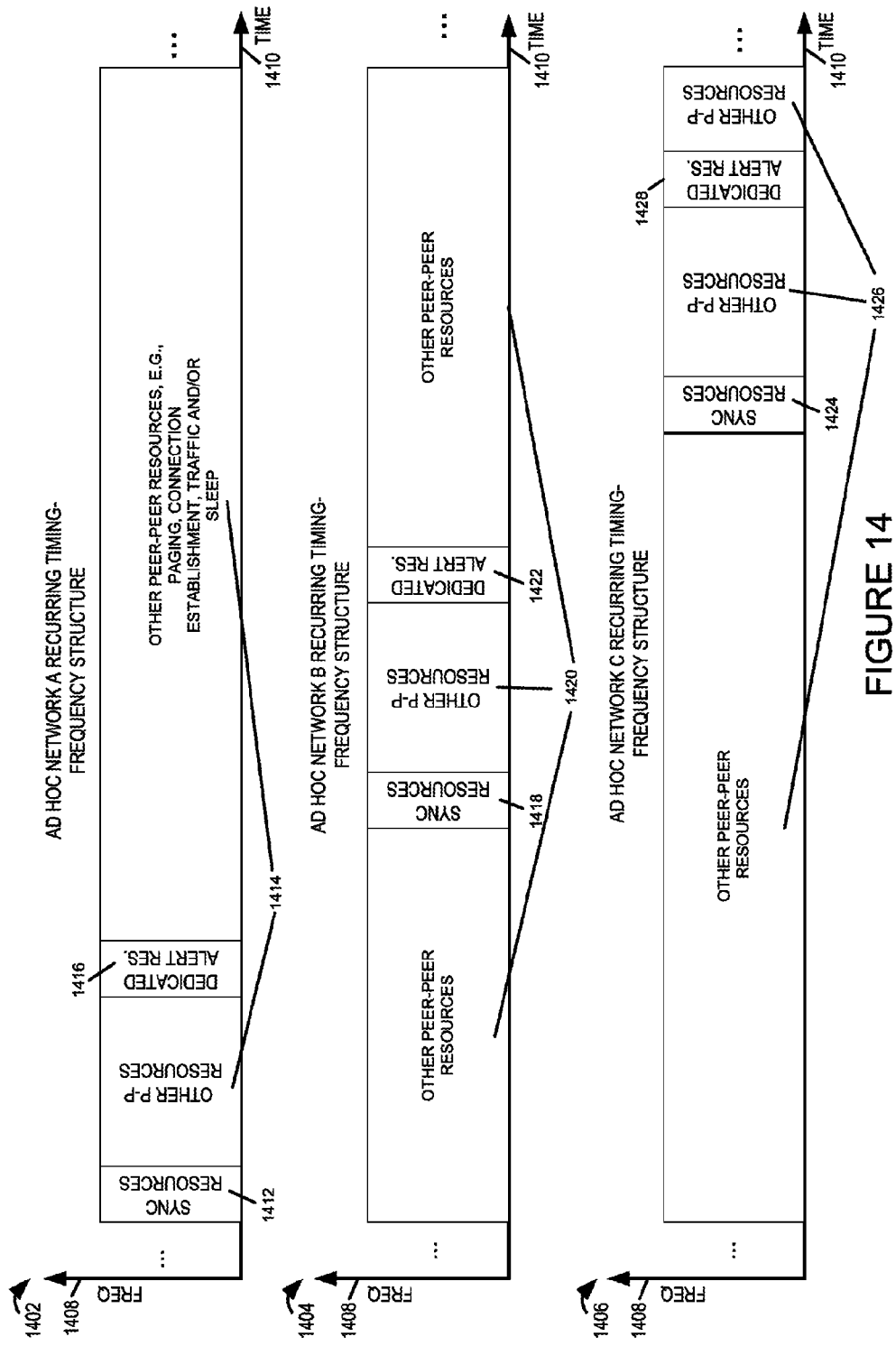

METHODS AND APPARATUS FOR SUPPORTING SYNCHRONIZATION BETWEEN GROUPS OF DEVICES

FIELD OF THE INVENTION

Various embodiments relate to wireless communications, and more particularly, to methods and apparatus for synchronizing groups of wireless communications devices.

BACKGROUND OF THE INVENTION

In some wireless communications systems, the implementation is such that a global timing signal is not used for synchronization. A global timing signal may not be available throughout the system or devices may not be implemented to receive and recover a global timing signal. For example, the devices may have limited capability and be low cost wireless communications devices without an embedded GPS receiver. In some wireless communications systems, there may exist several groups of wireless communications devices, with different groups operating using their own notion of time. The groups may have been formed independently from one another and may be initially geographically separated from one another. For example, two groups of users may be separated from one another, with devices in a first group initially being unable to communicate to devices in a second group due to path loss considerations and the lack of a backhaul link connection between the groups. Devices in the same group may be synchronized with each other.

At least some of the wireless communications devices in the system may be mobile devices. As devices move and wireless communications devices from different groups come in closer proximity to one another and/or channel conditions change, boundaries between the groups may begin to change. Direct communications between devices of different groups may become feasible. However, devices from different groups may have to synchronize to communicate.

When a mobile device, which could otherwise be in a sleep mode, has to search for devices from other groups, with which it is not synchronized, it expends valuable battery power. In addition, a device searching for devices of other groups may be suspending at least some operations in its own group during the time it devotes to searching. If each wireless device in a group acts independently, performing its own independent search, and re-synchronizing to other groups based only on its own search results, the amount of time and resources, e.g., battery power expended and air link resources, used to fully synchronize one group to another group may be substantial.

Based on the above discussion it should be appreciated that there is a need for improved methods and/or apparatus to support synchronization between groups of devices, where the groups are not synchronized. It would be beneficial if such methods and apparatus facilitated propagation of synchronization information to members of a group and/or allowed for rapid synchronization of a group.

SUMMARY OF THE INVENTION

Methods and apparatus related to supporting synchronization, e.g., rapid synchronization, between groups of wireless communications devices are described. Various described methods and apparatus are well suited for use in peer to peer wireless communications systems in which a plurality of ad hoc peer to peer networks may be formed, each ad hoc network operating with its own sense of timing synchronization.

Various methods and apparatus are directed to the propagation of synchronization information from one group of devices to another group of devices.

In some embodiments, a wireless communications device in a first group, which has detected a timing synchronization signal from a device in a second group, determines to re-synchronize one of the first and second groups of devices, e.g., to merge the two groups into a common group having a common sense of timing. The wireless communications device, intending to trigger and/or otherwise cause the re-synchronization, generates and transmits a re-synchronization alert signal in a dedicated air link communications resource. The dedicated air link communications resource is dedicated to carrying re-synchronization alert signals for the group intended to be re-synchronized and may be used by a device, e.g., any device, seeking to communicate a re-synchronization trigger to the group. The re-synchronization alert signal indicates that a re-synchronization operation is to be performed. In addition, in some, but not necessarily all embodiments, the re-synchronization alert signal also communicates information identifying when the devices to be re-synchronized should monitor for a new timing synchronization signal.

A device in the group, intended to be re-synchronized, which receives the re-synchronization alert, refrains from transmissions, e.g., during a time period following the re-synchronization alert, so that it is able to detect a new timing synchronization signal. The device, intended to be re-synchronized, which detects the new timing synchronization signal, updates its timing based on the received new timing synchronization signal and returns to normal network operation using the updated timing. Multiple devices in the group which receive the re-synchronization alert signal and subsequent new timing synchronization signal are concurrently re-synchronized to use the new timing, providing for a rapid re-synchronization operation.

An exemplary method of operating a wireless communications device, in accordance with some embodiments, includes determining that a network timing re-synchronization is to be performed, and transmitting a re-synchronization alert signal indicating that devices receiving the re-synchronization alert signal should perform a network timing re-synchronization operation. An exemplary wireless communications device, in accordance with some embodiments, comprises at least one processor configured to determine that a network timing re-synchronization is to be performed and transmit a re-synchronization alert signal indicating that devices receiving the re-synchronization alert signal should perform a network timing re-synchronization operation. The exemplary wireless communications device further comprises memory coupled to said at least one processor.

While various embodiments have been discussed in the summary above, it should be appreciated that not necessarily all embodiments include the same features and some of the features described above are not necessary but can be desirable in some embodiments. Numerous additional features, embodiments and benefits of various embodiments are discussed in the detailed description which follows.

BRIEF DESCRIPTION OF THE FIGURES

FIG. 14 is a drawing illustrating three exemplary recurring timing-frequency structures, which are not synchronized with respect to one another, that may be used by three exemplary peer to peer ad hoc networks in a peer to peer wireless communications system.

DETAILED DESCRIPTION

Figure 1:
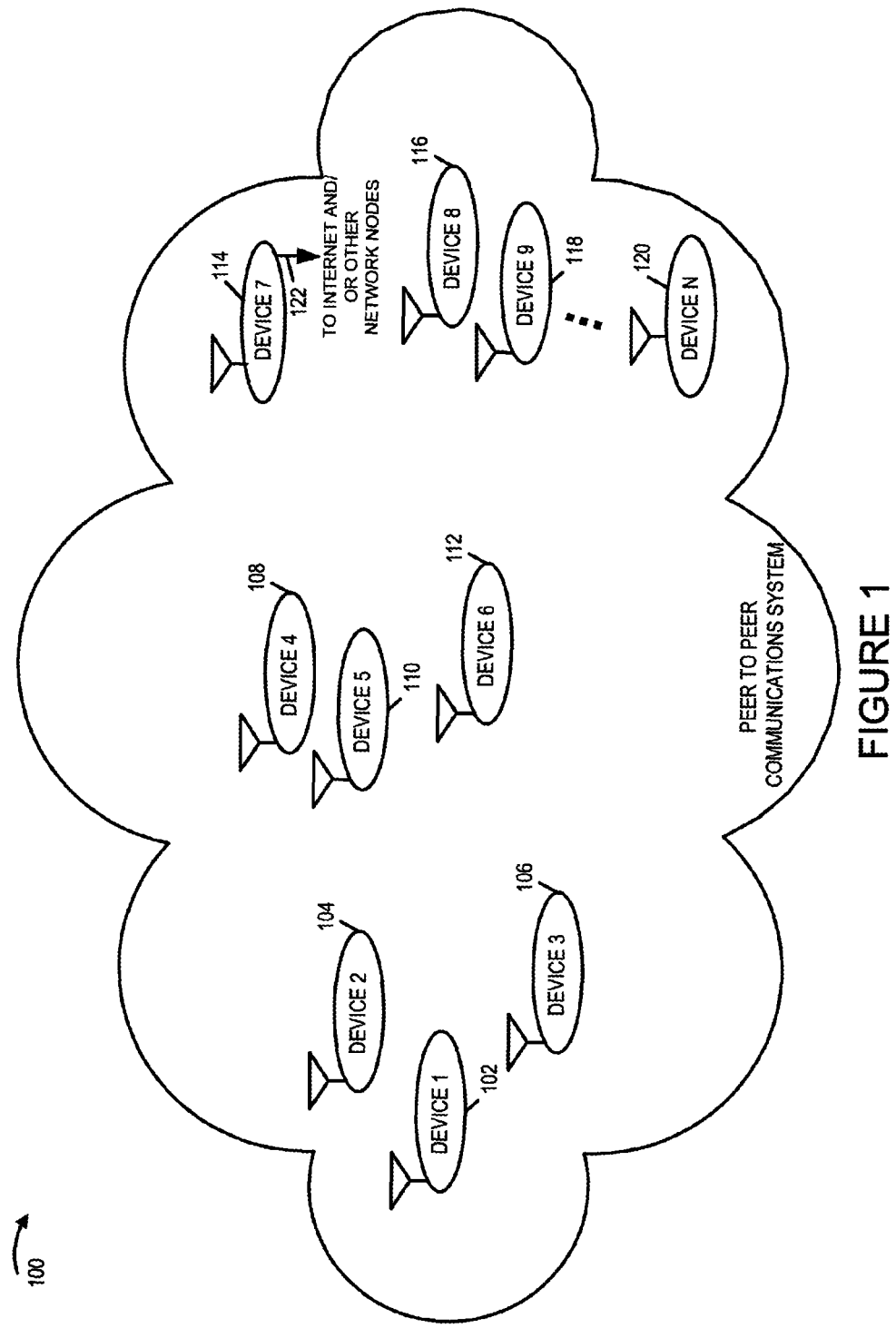
FIG. 1 is a drawing of an exemplary wireless peer to peer communications system in accordance with an exemplary embodiment.

FIG. 1 is a drawing of an exemplary wireless peer to peer communications system 100 in accordance with an exemplary embodiment. Exemplary wireless peer to peer communications system 100 includes a plurality of wireless communications devices (device 1 102, device 2 104, device 3 106, device 4 108, device 5 110, device 6 112, device 7 114, device 8 116, device 9 118, ..., device N 120. Some of the wireless communications devices in system 100, e.g., device 7 114, include an interface 122, to the Internet and/or other network nodes. Some of the wireless communications devices in system 100, e.g., device 1 102, device 2 104, device 3 106, device 4 108, device 5 110, device 6 112, device 8 116, device 9 118 and device N 120, are mobile wireless communications devices, e.g., handheld mobile devices.

Wireless communications devices in system 100 may form ad hoc peer to peer networks. The formed ad hoc peer to peer networks may be unsynchronized with respect to one another. Synchronization between unsynchronized ad hoc peer to peer networks, in various embodiments, is facilitated through the use of a re-synchronization alert signal and the propagation of synchronization information.

Figure 2:
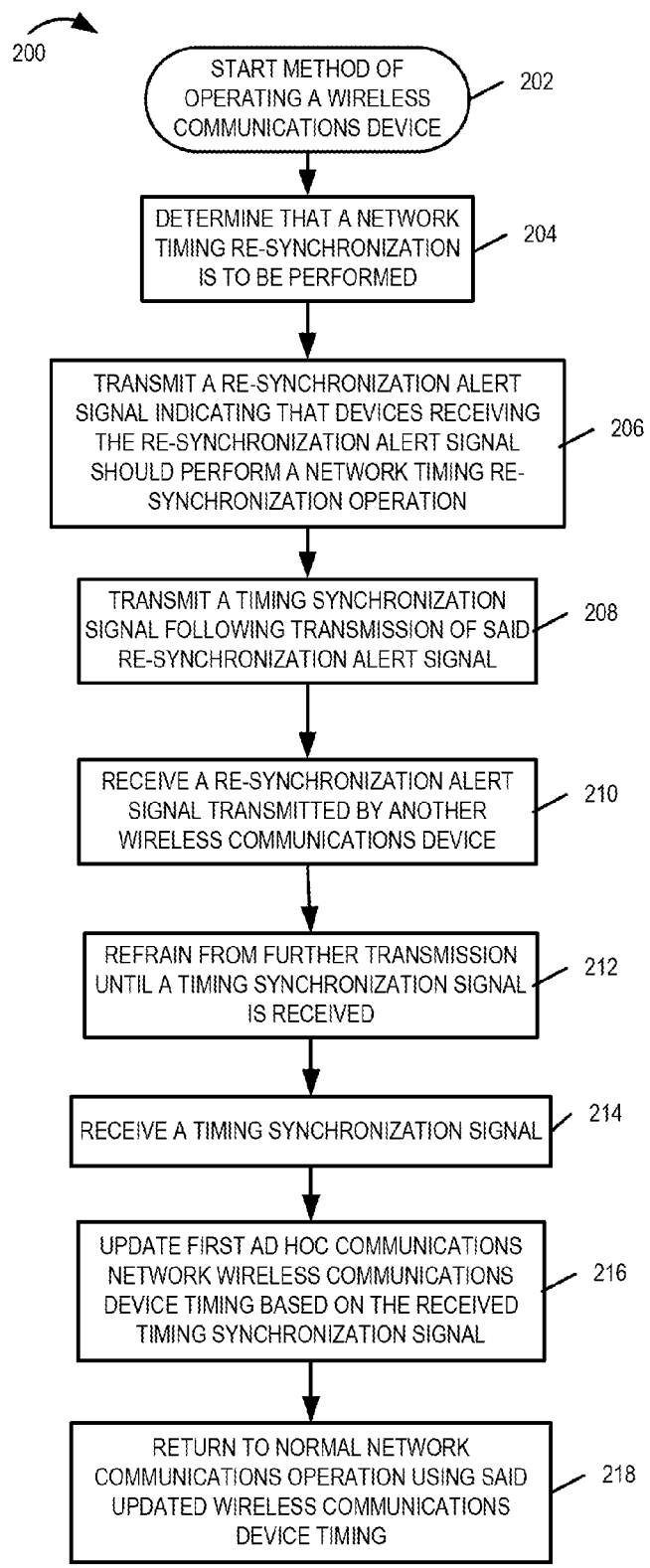
FIG. 2 is a flowchart of an exemplary method of operating a wireless communications device in accordance with an exemplary embodiment.

FIG. 2 is a flowchart 200 of an exemplary method of operating a wireless communications device in accordance with an exemplary embodiment. The wireless communications device implementing the method of flowchart 200 is, e.g., any of the wireless communications devices of system 100 of FIG. 1. Operation starts in step 202, where the wireless communications device is powered on and initialized. The wireless communicates device is, e.g., part of a first ad hoc communications network and synchronized to the timing of the first ad hoc communications network. Operation proceeds from step 202 to step 204. In step 204 the wireless communications device determines that a network timing re-synchronization is to be performed. Operation proceeds from step 204 to step 206.

In step 206 the wireless communications device transmits a re-synchronization alert signal indicating that devices receiving the re-synchronization alert signal should perform a network timing re-synchronization operation. In some embodiments, transmitting said re-synchronization alert signal includes using a dedicated communications resource, said dedicated communications resource being dedicated to communicating network re-synchronization alert signals. In various embodiments, said timing synchronization signal is transmitted within a predetermined timing window following transmission of said re-synchronization alert signal. In some embodiments, the wireless communications device is synchronized to the timing of a first ad hoc communications network and is within timing synchronization signal range of a second ad hoc communications network, and the timing synchronization signal propagates timing information from the second ad hoc communications network to the first ad hoc communications network. In some embodiments, the wireless communications device is synchronized to the timing of a first ad hoc communications network and is within timing synchronization signal range of a second ad hoc communications network, and the timing synchronization signal propagates timing information from the first ad hoc communications network to the second ad hoc communications network. Operation proceeds from step 206 to step 208.

In step 208 the wireless communications device transmits a timing synchronization signal following transmission of said re-synchronization alert signal. Operation proceeds from step 208 to step 210.

In step 210 the wireless communications device receives a re-synchronization alert signal transmitted by another wireless communications device. Operation proceeds from step 210 to step 212. In step 212 the wireless communications device refrains from further transmission until a timing synchronization signal is received. In step 214 the wireless communications device receives a timing synchronization signal. Operation proceeds from step 214 to step 216.

In step 216 the wireless communications device updates first ad hoc communications network wireless communications device timing based on the received timing synchronization signal. Operation proceeds from step 216 to step 218. In step 218 the wireless communications device returns to normal network communications operation using said updated wireless communications device timing.

In some embodiments, prior to step 204, the wireless communications device determines when to monitor for synchronization signals from devices of other networks, e.g., when to suspend its normal operation and listen for synchronization signals from a device from another ad hoc network with which it is not currently synchronized. In some embodiments, the wireless communications device makes its determination when to monitor for synchronization signals from other networks in accordance with a pre-defined deterministic function. In some embodiments, the wireless communications device makes its determination when to monitor for synchronization signal from other networks in accordance with a pseudo-random function.

In various embodiments, prior to step 204, the wireless communications device monitors for and detects a timing synchronization signal from a communications device of another networks. In various embodiments, the wireless communications measures the strength of the received signal.

In some embodiments, the wireless communications device performs, e.g., prior to step 204, one of more of the following steps for one or more networks: estimate a number of devices using a network, estimate loading for a network, estimate disruption to a network caused by a re-synchronization operation, estimate timing stability of a network. In some embodiments, the wireless communications device performs, e.g., prior to step 204, a step of estimating interference between networks.

In some embodiments, the wireless communications device makes a determination that a network timing re-synchronization is to be performed in step 204 as a function of one or more of: a number of devices estimated to be using a network, estimated network loading information, estimated disruption information, estimated timing stability information, and estimated interference information. In some embodiments, in addition to determining that a network timing re-synchronization operation is to be performed, the exemplary method includes a step of determining which network from among a plurality of alternative networks is to be timing re-synchronized. In some embodiments, the wireless communications makes a determination as to which network is to be re-synchronized from among the plurality of alternative networks as a function of one or more of: a number of devices estimated to be using a network, estimated network loading information, estimated disruption information, estimated timing stability information, and estimated interference information.

In various embodiments, prior to step 206, the wireless communications device performs a step of generating a re-synchronization alert signal. In some such embodiments, the step of generating a re-synchronization alert signal includes including information in the re-synchronization alert signal indicating the time when a timing synchronization signal will be transmitted. e.g., information indicating an approximate point in the current timing structure of the device to be re-synchronized in which it may expect to receive a timing synchronization signal in accordance with the new timing.

In some embodiments, the step of generating a re-synchronization alert signal includes including in said re-synchronization alert signal one or more of: information identifying a recurring time period to be used following re-synchronization, information identifying a recurring air link frequency/ time structure to be used following re-synchronization, and information identifying a frequency band to be used following resynchronization.

In some embodiments, subsequent to step 210 in which the wireless communications device receives a re-synchronization alert signal, the wireless communications device performs a step of recovering information from a received re-synchronization alert signal. In some such embodiments, the wireless communications device recovers from the received re-synchronization alert signal one or more of: information indicating an approximate point in its current timing structure in which it may expect to receive a timing synchronization signal corresponding to new timing synchronization, information identifying a recurring time period to be used following re-synchronization, information identifying a recurring air link frequency/time structure to be used following re-synchronization, and information identifying a frequency band to be following resynchronization.

In some embodiments, in which approximate timing information of the expected arrival of the timing synchronization signal of step 214 is communicated and recovered from the re-synchronization alert signal, the wireless communications device need not, and does not suspend current normal operations until the indicated time of the new expected re-synchronization signal approaches, at which point in time its starts listening for the new synchronization signal. In some embodiments, in which the re-synchronization alert signal does not convey such timing information, the wireless communications device refrains from transmission immediately following receipt of a re-synchronization alert signal and starts listening for an expected synchronization signal, e.g., for the duration of a pre-determined window, wherein the pre-determined window allows for the worst case scenario of expected delay between re-synchronization alert and subsequent synchronization signal in accordance with the timing structures in use.

It should be appreciated that the exemplary wireless communications device implementing the flowchart 200 of FIG. 2 can both transmit re-synchronization alert signals triggering re-synchronization in other devices and receive re-synchronization alert signal in which case it is to be re-synchronized in response to another device.

Figure 3:
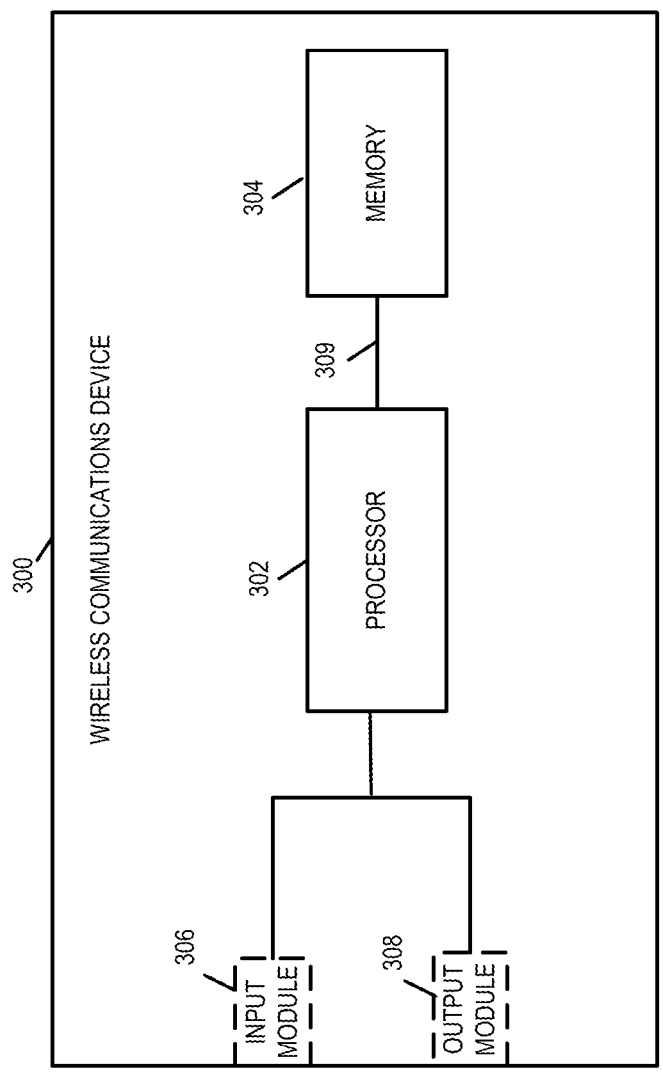
FIG. 3 is an exemplary wireless communications device, e.g., a mobile node supporting peer to peer communications, in accordance with an exemplary embodiment.

FIG. 3 is a drawing of an exemplary wireless communications device 300, in accordance with an exemplary embodiment. Exemplary wireless communications device 300 is, e.g., one of the wireless communications devices of FIG. 1. Exemplary wireless communications device 300 may, and sometimes does, implement a method in accordance with flowchart 200 of FIG. 2.

Wireless communications device 300 includes a processor 302 and memory 304 coupled together via a bus 309 over which the various elements (302, 304) may interchange data and information. Communications device 300 further includes an input module 306 and an output module 308 which may be coupled to processor 302 as shown. However, in some embodiments, the input module 306 and output module 308 are located internal to the processor 302. Input module 306 can receive input signals. Input module 306 can, and in some embodiments does, include a wireless receiver and/or a wired or optical input interface for receiving input. Output module 308 may include, and in some embodiments does include, a wireless transmitter and/or a wired or optical output interface for transmitting output.

Processor 302 is configured to determine that a network timing re-synchronization is to be performed and transmit a re-synchronization alert signal indicating that devices receiving the re-synchronization alert signal should perform a network timing re-synchronization operation. In some embodiments, processor 302 is configured to use a dedicated communications resource, as part of being configured to transmit said re-synchronization alert signal, said dedicated communications resource being dedicated to communicating network re-synchronization alert signals.

Processor 302 is further configured to transmit a timing synchronization signal following transmission of said re-synchronization alert signal. Processor 302 is further configured to control said timing synchronization signal transmission to be within a predetermined timing window following transmitting of said re-synchronization alert signal.

In some embodiments, the wireless communications device 300 is synchronized to the timing of a first ad hoc communications network and is within timing synchronization signal range of a second ad hoc communications network, and said timing synchronization signal propagates timing information from the second ad hoc communications network to the first ad hoc communications network. In some embodiments, the wireless communications device 300 is synchronized to the timing of a first ad hoc communications network and is within timing synchronization signal range of a second ad hoc communications network and said timing synchronization signal propagates timing information from the first ad hoc communications network to the second ad hoc communications network.

Processor 302 is further configured to receive a re-synchronization alert signal transmitted by another wireless communications device, refrain from further transmissions until a timing synchronization signal is received, and update first ad hoc communications network wireless communications device timing based on the received timing synchronization signal.

Processor 302 is further configured to return to normal network communication operation using said updated wireless communications device timing.

Figure 4:
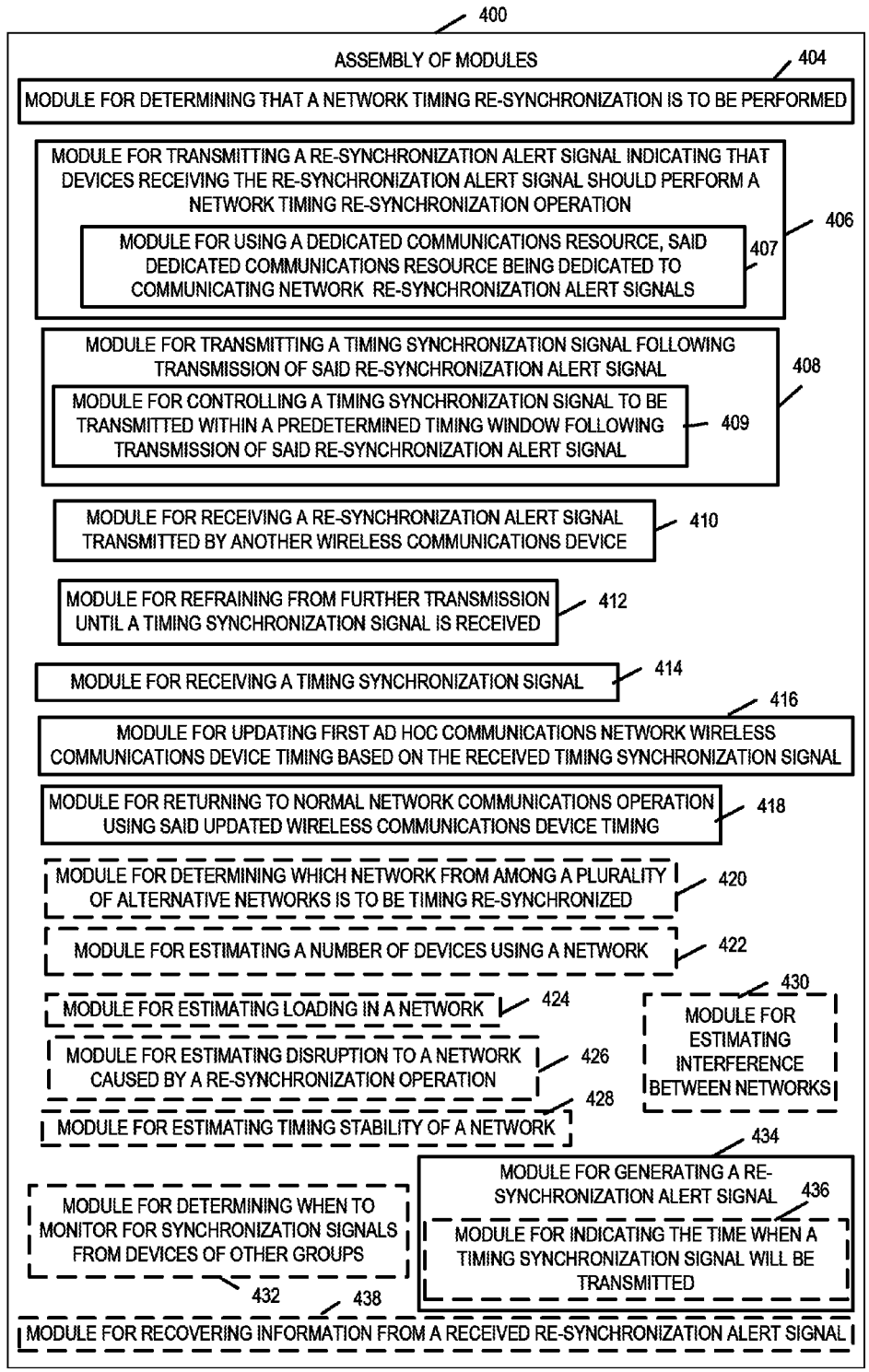
FIG. 4 is an assembly of modules which may be used in the exemplary wireless communications device of FIG. 3.

FIG. 4 is an assembly of modules 400 which can, and in some embodiments is, used in the wireless communications device 300 illustrated in FIG. 3. The modules in the assembly 400 can be implemented in hardware within the processor 302 of FIG. 3, e.g., as individual circuits. Alternatively, the modules may be implemented in software and stored in the memory 304 of the communications device 300 shown in FIG. 3. While shown in the FIG. 3 embodiment as a single processor, e.g., computer, it should be appreciated that the processor 302 may be implemented as one or more processors, e.g., computers. When implemented in software the modules include code, which when executed by the processor, configure the processor, e.g., computer, 302 to implement the function corresponding to the module. In some embodiments, processor 302 is configured to implement each of the modules of the assembly of modules 400. In embodiments where the assembly of modules 400 is stored in the memory 304, the memory 304 is a computer program product comprising a computer readable medium comprising code, e.g., individual code for each module, for causing at least one computer, e.g., processor 302, to implement the functions to which the modules correspond.

Completely hardware based or completely software based modules may be used. However, it should be appreciated that any combination of software and hardware (e.g., circuit implemented) modules may be used to implement the functions. As should be appreciated, the modules illustrated in FIG. 4 control and/or configure the communications device 300 or elements therein such as the processor 302, to perform the functions of the corresponding steps illustrated and/or described in the method of flowchart 200 of FIG. 2.

Assembly of modules 400 includes a module 404 for determining that a network timing re-synchronization is to be performed, a module 406 for transmitting a re-synchronization alert signal indicating that devices receiving the re-synchronization alert signal should perform a network timing re-synchronization operation, and a module 408 for transmitting a timing synchronization signal following transmission of said re-synchronization alert signal. Assembly of modules 400 further includes a module 410 for receiving a re-synchronization alert signal transmitted by another wireless communications device, a module 412 for refraining from further transmission until a timing synchronization signal is received, a module 414 for receiving a timing synchronization signal, a module 416 for updating first ad hoc network wireless communications device timing based on the received timing synchronization signal, and a module 418 for returning to normal network communications operation using said updated wireless communications device timing.

Module 406 includes, in some embodiments, a module 407 for using a dedicated communications resource, said dedicated communications resource being dedicated to communicating network re-synchronization alert signals. Module 408, in some embodiments, includes a module 409 for controlling a timing synchronization signal to be transmitted within a predetermined timing window following transmission of said re-synchronization alert signal.

Assembly of modules 400, in some embodiments, includes one or more of a module 420 for determining which network from among a plurality of alternative networks is to be timing re-synchronized, a module 422 for estimating a number of devices using a network, a module 424 for estimating loading in a network, a module 426 for estimating disruption to a network caused by a re-synchronization operation, a module 428 for estimating timing stability of a network, and a module 430 for estimating interference between networks. In some embodiments, module 404 makes its determination that a network timing re-synchronization is to be performed as a function of one or more of: a number of devices estimated to be using a network from module 422, estimated network loading information from module 424, estimated disruption information from module 426, estimated timing stability information from module 428, and estimated interference information from module 430. In some embodiments, module 420 makes its determination of which network to re-synchronize as a function of one or more of: a number of devices estimated to be using a network from module 422, estimated network loading information, e.g., air link resource loading and/or peer to peer traffic data air link resource loading, from module 424, estimated disruption information from module 426, estimated timing stability information from module 428, and estimated interference information from module 430.

Consider an example, in which the wireless communications device is considering which one of two adjacent ad hoc networks is to be timing re-synchronized. Module 422 estimates a number of devices currently using each of the two adjacent ad hoc networks. In some embodiments, module 420 determines to re-synchronize the ad-hoc network having the lower number of estimated users, given other conditions being equivalent.

Consider another example, in which the wireless communications device is considering whether or not a network should be re-synchronized and which network from among three adjacent ad-hoc networks are under consideration for re-synchronization should be re-synchronized if it is determined to re-synchronize. Further consider that the loading determination of one network has been determined to be very high, while the loading of the other two networks has been determined to very low. In some embodiments, in such a scenario, module 404 determines to re-synchronize and module 420 determines to re-synchronize one of the two lower loaded networks such as to merge the two lower loaded networks into a single network with common timing.

Consider another example in which one ad hoc network has a higher number of established peer to peer connections than another ad hoc network. Disruption estimation module 426, in some embodiments, estimates that re-synchronizing the network with the higher number of established peer to peer connections is likely to cause more disruption than re-synchronizing the network with the fewer number of connections. In some embodiments, module 420 determines to re-synchronize the network which is likely to result in the least amount of disruption based on the estimations, given other conditions being equivalent.

Consider another example, in which a first ad-hoc network includes a wireless device with a high level of inherent timing stability, e.g., the device is, e.g., a fixed location wireless device supporting peer to peer signaling, which is not size constrained, does not rely on a battery as its power source, is temperature stabilized, and includes high quality components including a highly stable oscillator, while a second ad hoc network, adjacent the first network, does not include such a device with a high level of inherent stability. In some embodiments, the high stability device is used by the first network to maintain a higher level of stability in the first network than in the second network. In some such embodiments, module 428 determines a stability level for the first and second networks. In some such embodiments, module 420 determines to re-synchronize the less stable network, the second network, and propagate timing information from the first network to the second network.

In some embodiments, when module 430 estimates that the interference level between two adjacent ad-hoc networks is too high, e.g., a measured SNR is below a predetermined threshold or successful data recovery is below a predetermined threshold, module 404 determines that a network timing re-synchronization is to be performed and module 430 determines that the network timing re-synchronization is to be performed to one of the two networks.

Assembly of modules 400 further includes a module 434 for generating a re-synchronization alert signal. In some embodiments, module 434 includes a module 436 for indicating when a timing synchronization signal will be transmitted, e.g., information indicating an approximate point in its current timing structure of the device to be re-synchronized in which it may expect to receive a timing synchronization signal in accordance with the new timing. In some embodiments, assembly of modules 400 further includes a module 438 for recovering information from a received re-synchronization alert signal, e.g., for recovering information indicating an approximate point in its current timing structure of the device being re-synchronized in which it may expect to receive a timing synchronization signal in accordance with the new timing. In such an embodiment, the device to be re-synchronized need not suspend current normal operations until the indicated time of the new expected re-synchronization signal approaches, at which point in time its starts listening for the new synchronization signal. In some embodiments, in which the re-synchronization alert signal does not convey such timing information, the device to be re-synchronized refrains from transmission immediately following receipt of a re-synchronization alert signal and starts listening for an expected synchronization signal, e.g., for the duration of pre-determined window, wherein the pre-determined window allows for the worst case scenario of expected delay between re-synchronization alert and subsequent synchronization signal in accordance with the timing structures in use.

In some embodiments, the module for generating a re-synchronization alert signal 434 generates a re-synchronization alert signal that includes one or more of: information identifying a recurring time period to be used following re-synchronization, information identifying a recurring air link frequency/time structure to be used following re-synchronization, and information identifying a frequency band to be used following resynchronization. In some embodiments, the module for recovering information from a received re-synchronization alert signal 438 recovers one or more of: information identifying a recurring time period to be used following re-synchronization, information identifying a recurring air link frequency/time structure to be used following re-synchronization, and information identifying a frequency band to be following resynchronization.

In various embodiments, assembly of modules 400 includes a module 432 for determining when to monitor for synchronization signals from devices of other groups, e.g., when to suspend its normal operation and listen for synchronization signals from a device from another group with which it is not currently synchronized. In some embodiments, module 432 makes its determination in accordance with a pre-defined deterministic function. In some embodiments, module 432 makes its determination in accordance with a pseudo-random function.

Figure 5:
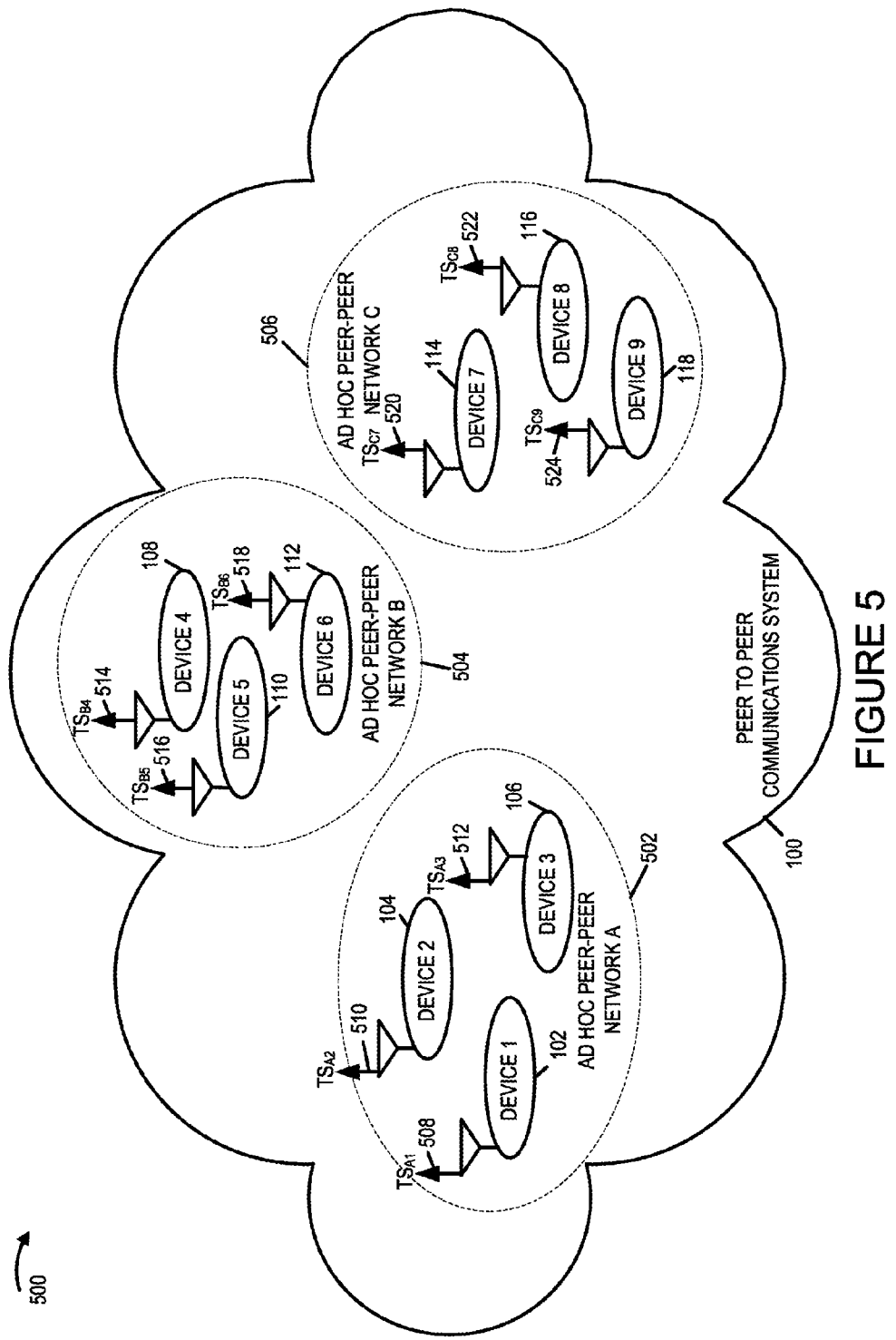
FIG. 5 is a drawing illustrating the exemplary peer to peer communications system of FIG. 1 in which various wireless communications devices have formed ad hoc peer to peer networks.

FIG. 5 through FIG. 13 are a set of drawings illustrating an example in which a plurality of ad hoc peer to peer networks, each network operating with different timing synchronization, are merged to use common timing synchronization, in accordance with an exemplary embodiment. FIG. 5 is a drawing 500 illustrating the exemplary peer to peer communications system 100 of FIG. 1 in which various wireless communications devices have formed ad hoc peer to peer networks.

Device 1 102, device 2 104 and device 3 106 have formed ad hoc peer to peer network A 502 and are following a common timing structure and have a common sense of timing synchronization. In accordance with the timing structure and synchronization of network A 502, devices (device 1 102, device 2 104, device 3 106), generate and transmit timing synchronization signals ($TS_{A1}$ 508, $TS_{A2}$ 510, $TS_{A3}$ 512), respectively.

Device 4 108, device 5 110 and device 6 112 have formed ad hoc peer to peer network B 504 and are following a common timing structure and have a common sense of timing synchronization. In accordance with the timing structure and synchronization of network B 504, devices (device 4 108, device 5 110, device 6 112), generate and transmit timing synchronization signals ($TS_{B4}$ 514, $TS_{B5}$ 516, $TS_{B6}$ 518), respectively.

Device 7 114, device 8 116 and device 9 118 have formed ad hoc peer to peer network C 506 and are following a common timing structure and have a common sense of timing synchronization. In accordance with the timing structure and synchronization of network C 506, devices (device 7 114, device 8 116, device 9 118), generate and transmit timing synchronization signals ($TS_{C7}$ 520, $TS_{C8}$ 522, $TS_{C9}$ 524), respectively.

Figure 6:
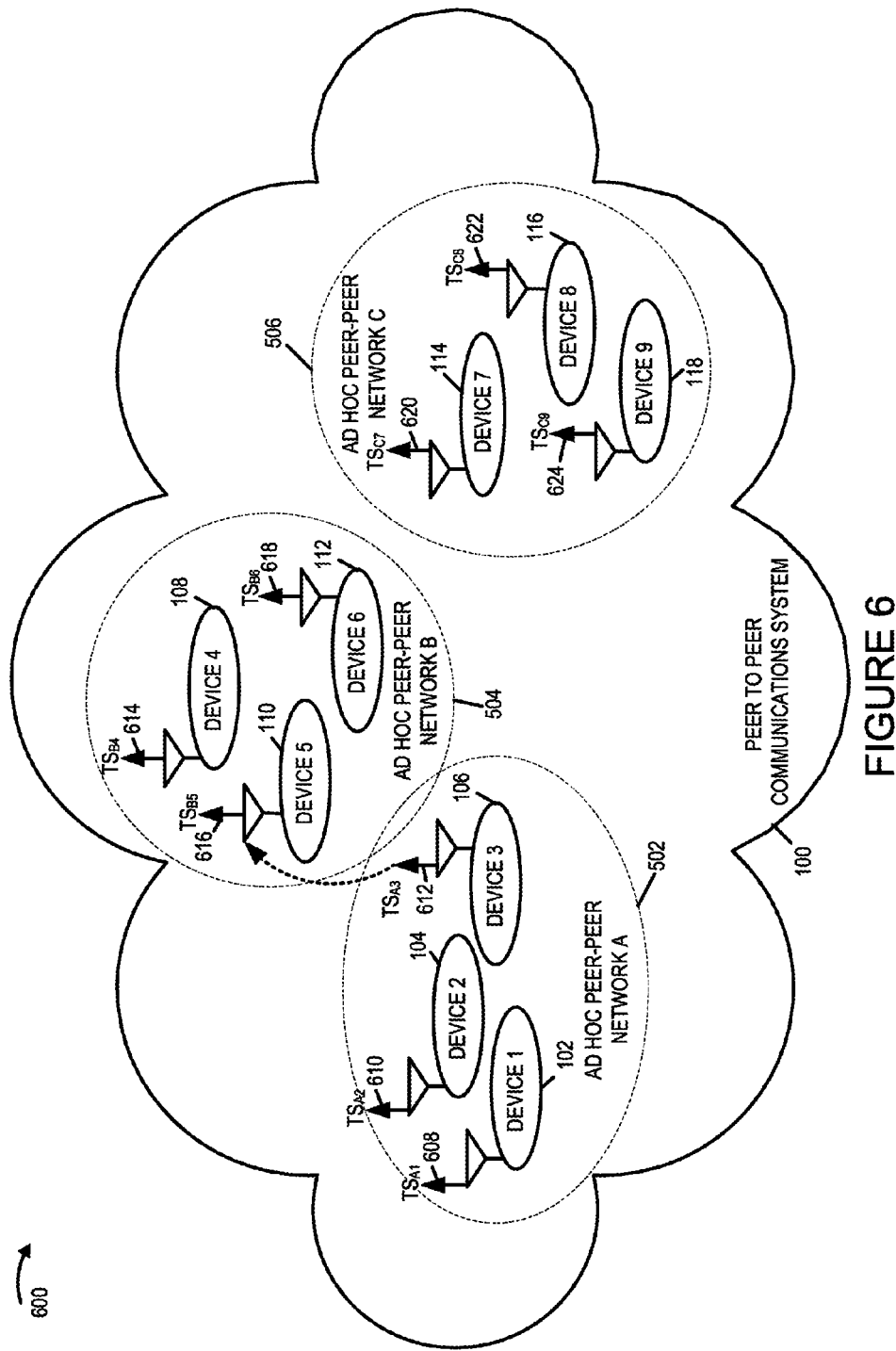
FIG. 6 is a drawing illustrating an example in which timing synchronization information pertaining to ad hoc network A, which was transmitted from a device in ad hoc network A, is being received and recovered by a device in ad hoc network B.

Drawing 600 of FIG. 6 illustrates exemplary system 100 during a subsequent time period with respect to FIG. 5. In accordance with the timing structure and synchronization of network A 502, devices (device 1 102, device 2 104, device 3 106), generate and transmit timing synchronization signals ($TS_{A1}$ 608, $TS_{A2}$ 610, $TS_{A3}$ 612), respectively. In accordance with the timing structure and synchronization of network B 504, devices (device 4 108, device 5 110, device 6 112), generate and transmit timing synchronization signals (TS$_{B4}$ 614, TS$_{B5}$ 616, TS$_{B6}$ 618), respectively. In accordance with the timing structure and synchronization of network C 506, devices (device 7 114, device 8 116, device 9 118), generate and transmit timing synchronization signals (TS$_{C7}$ 620, TS$_{C8}$ 622, TS$_{C9}$ 624), respectively.

In the example of FIG. 6, device 5 110 of network B 504 is closer to device 3 106 of network A 502, than is the situation in FIG. 5. Device 5 110 of network B 504 receives timing synchronization TS$_{A3}$ 612 from device 3 106 of network A 502. Device 5 110 determines that a network timing re-synchronization is to be performed.

Figure 7:
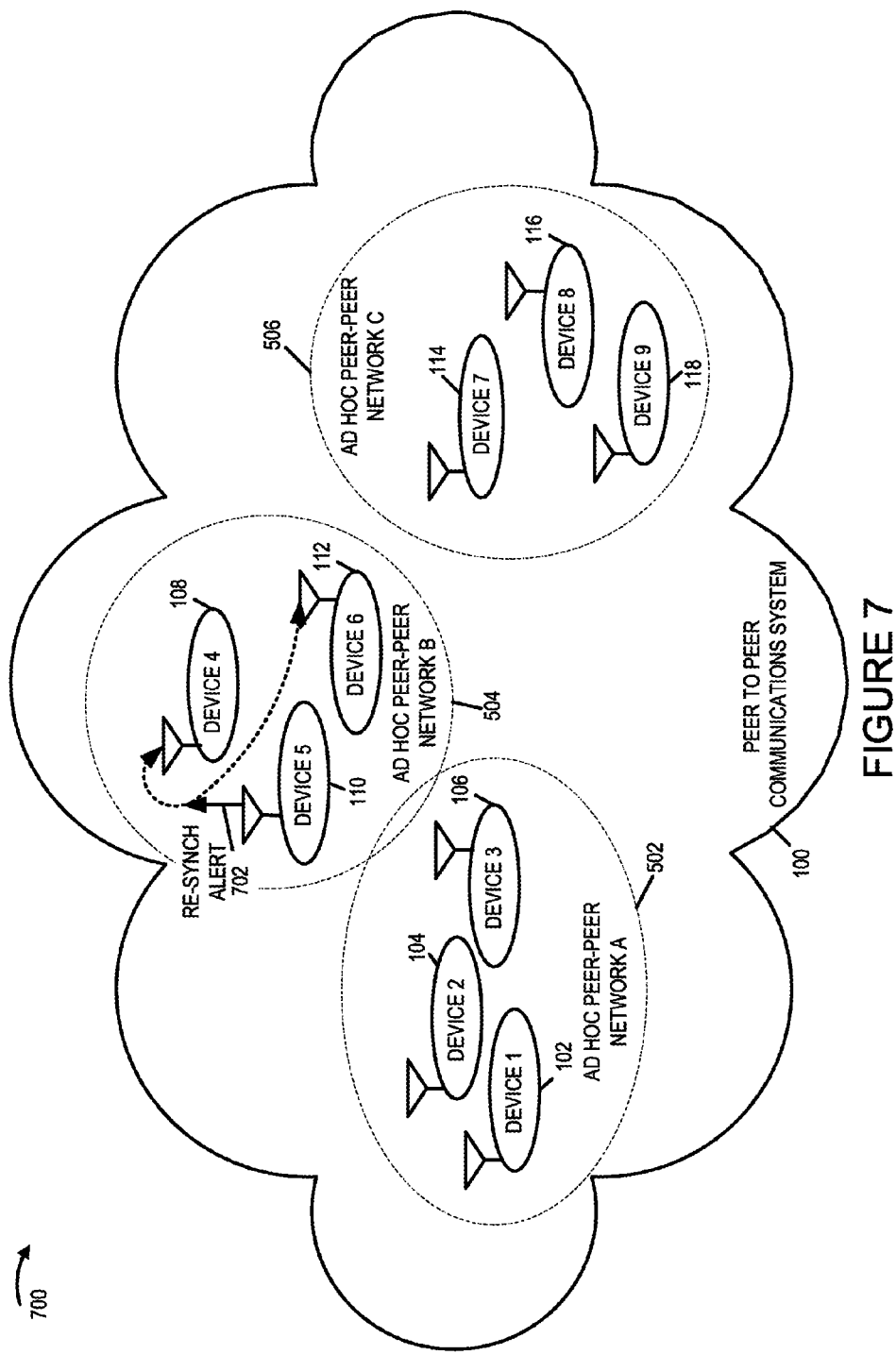
FIG. 7 is a drawing illustrating an example, in which a device in ad hoc network B has determined that a network timing synchronization should be performed and transmits a re-synchronization alert signal to the devices in network B using a dedicated re-synchronization alert communications resource.

Drawing 700 of FIG. 7 illustrates exemplary system 100 during a subsequent time period with respect to FIG. 6. Device 5 110 generates and transmits re-synchronization alert signal 702 indicating that devices in its network receiving the re-synchronization alert signal 702 should perform a network timing re-synchronization operation. A dedicated communications resource in the timing/frequency structure being used for network B 504 is used to carry the re-synchronization alert signal. The dedicated communications resource is a resource dedicated to communications network re-synchronization alert signals. The other devices (device 4 108, device 6 112) in network B 504, when not transmitting a re-synchronization alert signal, monitor the dedicated resource to detect for re-synchronization alert signals from other devices. Devices (device 4 108 and device 6 112) receive re-synchronization alert signal, and then refrain from further transmissions while monitoring for a timing synchronization signal, e.g., during a predetermined timing window following the re-synchronization alert signal.

Figure 8:
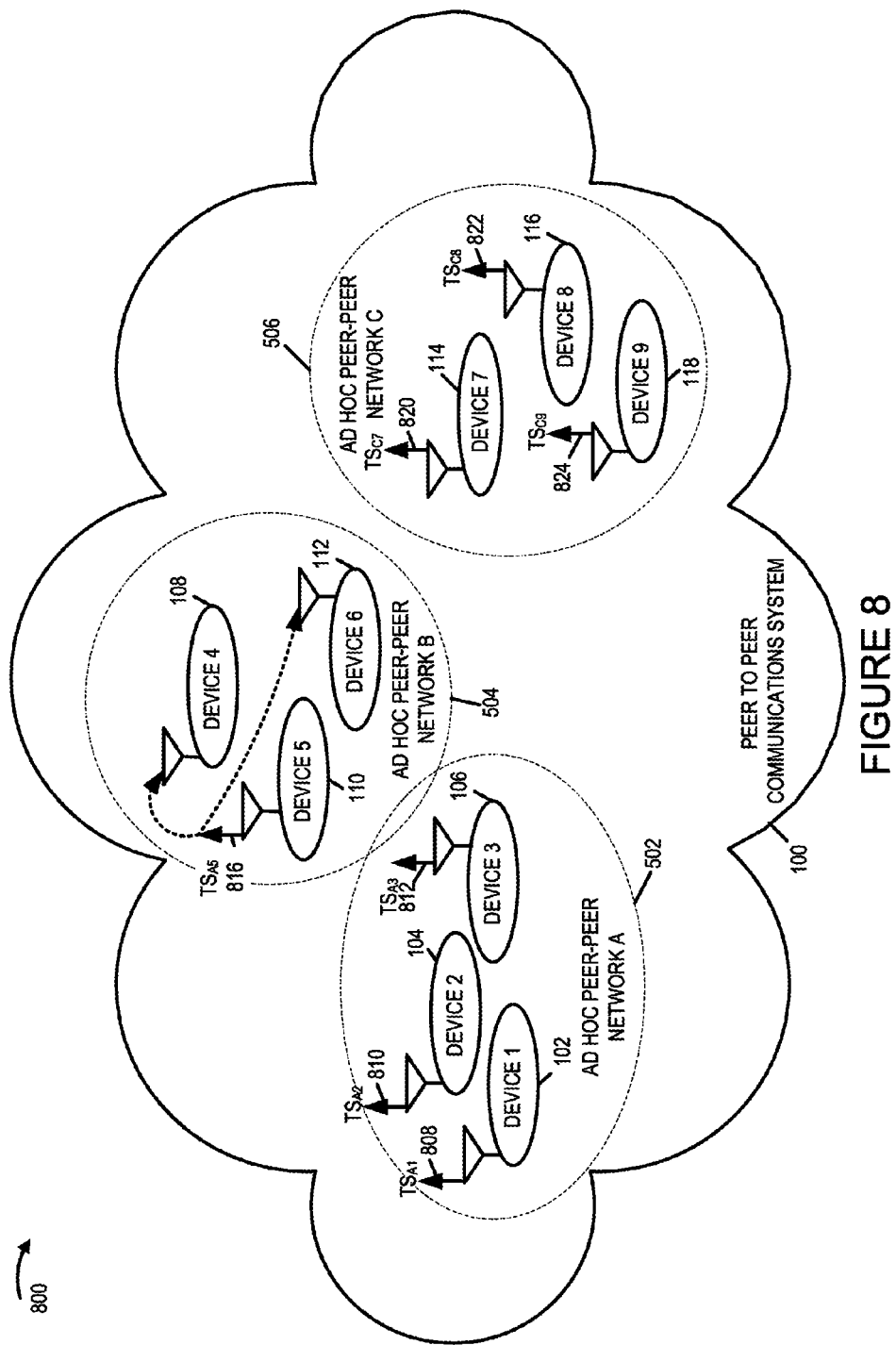
FIG. 8 is a drawing illustrating an example, in which a device in network B, which has previously transmitted a timing synchronization alert signal, transmits a timing synchronization signal to propagate the timing synchronization information pertaining to network A to other devices of network B.

Drawing 800 of FIG. 8 illustrates exemplary system 100 during a subsequent time period with respect to FIG. 7. Device 5 110 generates and transmits timing synchronization signal TS$_{A5}$ 816 which is received by device 4 108 and device 6 112. Timing synchronization signal TS$_{A5}$ 816 is in accordance with the timing structure and synchronization of network A 502. Device 4 108 and device 6 112 update their timing based on the received timing synchronization signal TS$_{A5}$ 816, e.g., synchronizing with respect to the timing structure and synchronization being followed by network A 502.

In accordance with the timing structure and synchronization of network A 502, devices (device 1 102, device 2 104, device 3 106), generate and transmit timing synchronization signals (TS$_{A1}$ 808, TS$_{A2}$ 810, TS$_{A3}$ 812), respectively. In accordance with the timing structure and synchronization of network C 506, devices (device 7 114, device 8 116, device 9 118), generate and transmit timing synchronization signals (TS$_{C7}$ 820, TS$_{C8}$ 822, TS$_{C9}$ 824), respectively.

Figure 9:
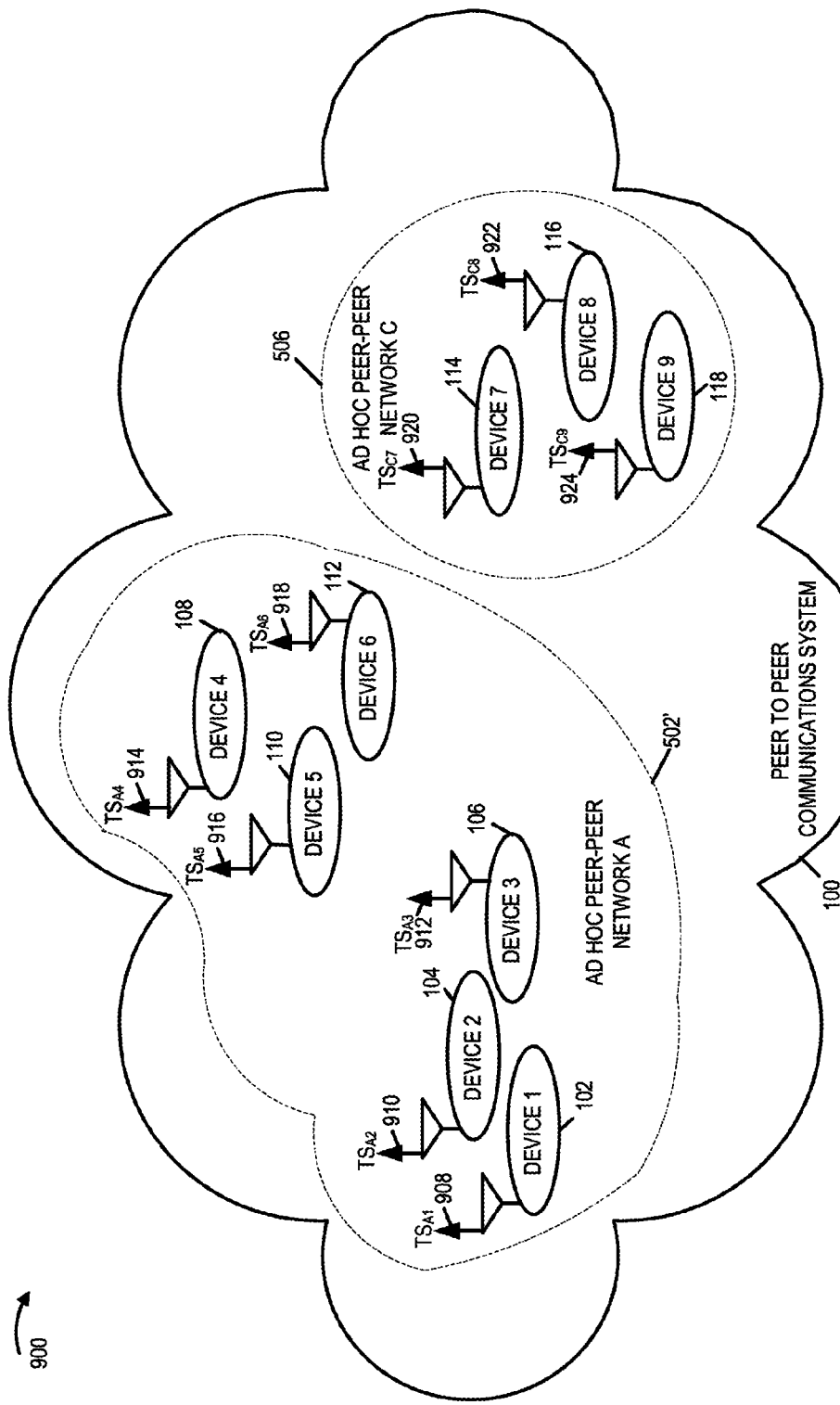
FIG. 9 is a drawing which illustrates that the devices which previously belonged to network B have updated their timing and synchronized with respect to the network A timing, and have returned to normal network peer to peer communications using the updated timing.

Drawing 900 of FIG. 9 illustrates exemplary system 100 during a subsequent time period with respect to FIG. 8. Device 4 108 and device 6 112 which have updated their timing have returned to normal network communications operation using the updated wireless communications device timing. Thus ad hoc peer to peer network B 504 has merged with ad hoc peer to peer network A 502 to form ad hoc peer to peer network A 502'.

In accordance with the timing structure and synchronization of network A 502', devices (device 1 102, device 2 104, device 3 106, device 4 108, device 5 110, device 6 112), generate and transmit timing synchronization signals (TS$_{A1}$ 908, TS$_{A2}$ 910, TS$_{A3}$ 912, TS$_{A4}$ 914, TS$_{A5}$ 916, TS$_{A6}$ 918), respectively. In accordance with the timing structure and synchronization of network C 506, devices (device 7 114, device 8 116, device 9 118), generate and transmit timing synchronization signals (TS$_{C7}$ 920, TS$_{C8}$ 922, TS$_{C9}$ 924), respectively.

Figure 10:
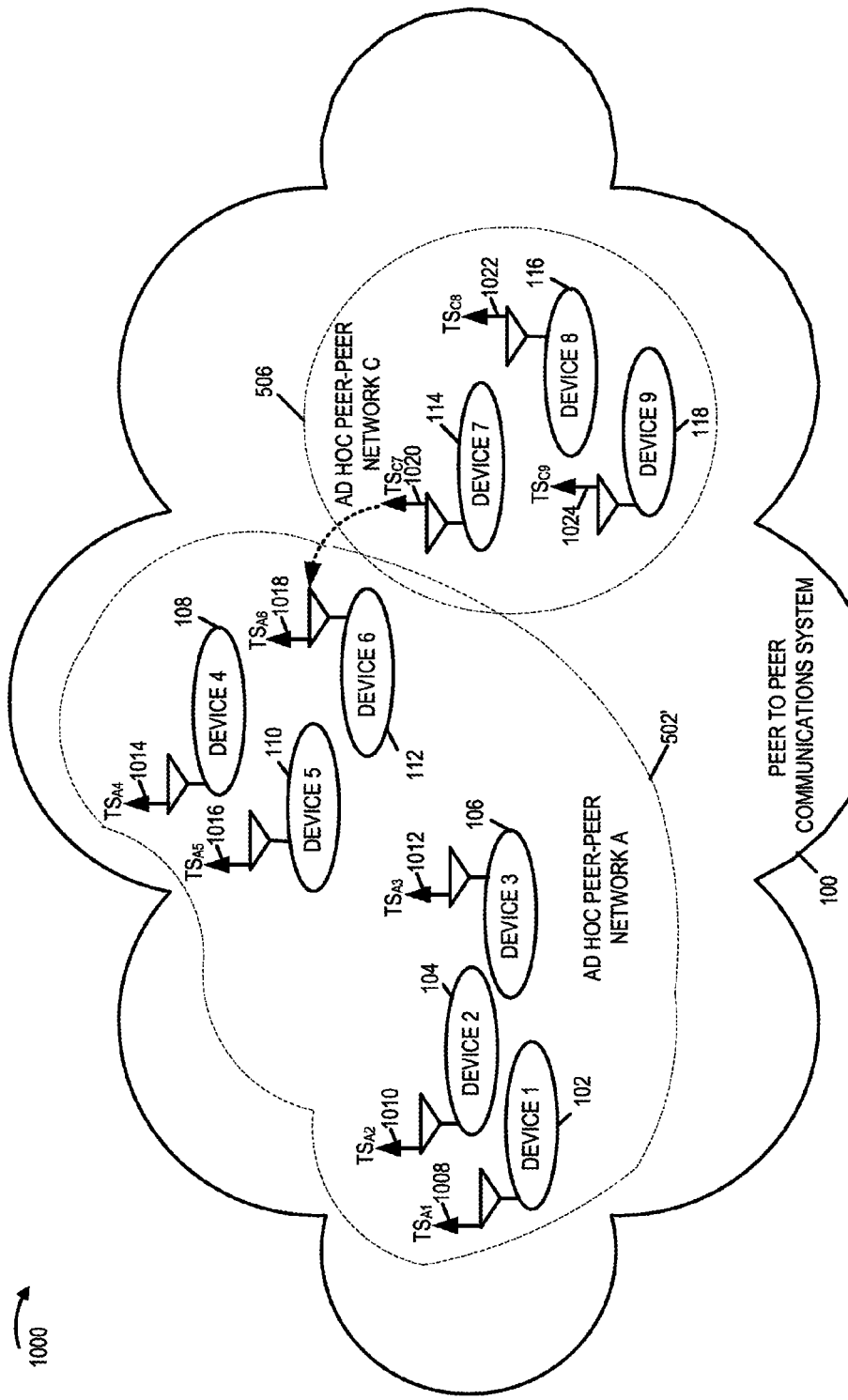
FIG. 10 is a drawing illustrating an example in which timing synchronization information pertaining to ad hoc network C, which was transmitted from a device in ad hoc network C, is being received and recovered by a device in enlarged ad hoc network A.

Drawing 1000 of FIG. 10 illustrates exemplary system 100 during a subsequent time period with respect to FIG. 9. In accordance with the timing structure and synchronization of network A 502', devices (device 1 102, device 2 104, device 3 106, device 4 108, device 5 110, device 6 112), generate and transmit timing synchronization signals (TS$_{A1}$ 1008, TS$_{A2}$ 1010, TS$_{A3}$ 1012, TS$_{A4}$ 1014, TS$_{A5}$ 1016, TS$_{A6}$ 1018), respectively. In accordance with the timing structure and synchronization of network C 506, devices (device 7 114, device 8 116, device 9 118), generate and transmit timing synchronization signals (TS$_{C7}$ 1020, TS$_{C8}$ 1022, TS$_{C9}$ 1024), respectively.

In the example of FIG. 10, device 7 114 of network C 506 is closer to device 6 112 of network A 502', than is the situation in FIG. 9. Device 6 112 of network A 502' receives timing synchronization signal TS$_{C7}$ 1020 from device 7 114 of network C 506. Device 6 112 determines that a network timing re-synchronization is to be performed.

Figure 11:
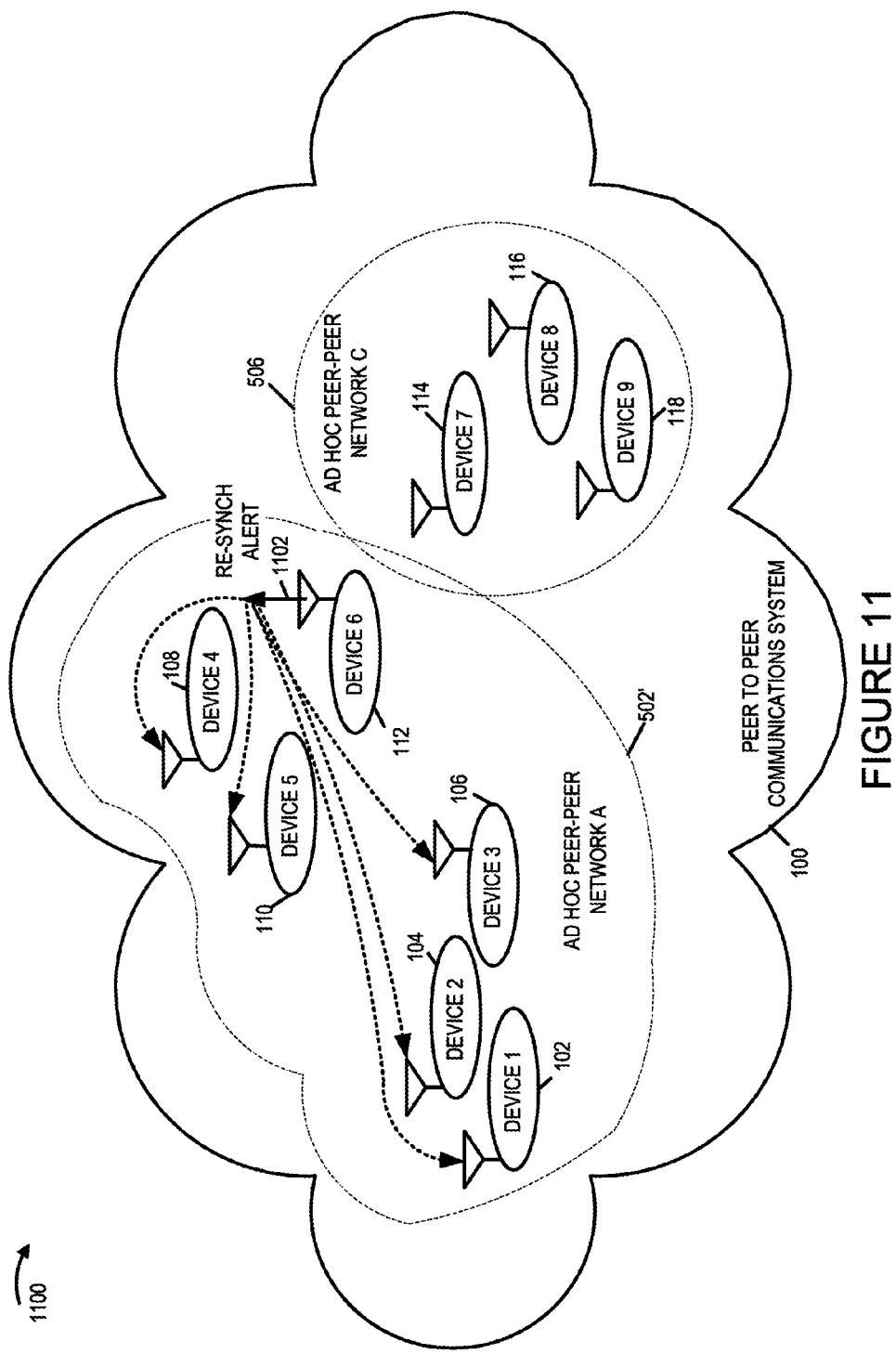
FIG. 11 is a drawing illustrating an example, in which a device in enlarged ad hoc network A has determined that a network timing synchronization should be performed and transmits a re-synchronization alert signal to the devices in enlarged network A using a dedicated re-synchronization alert communications resource.

Drawing 1100 of FIG. 11 illustrates exemplary system 100 during a subsequent time period with respect to FIG. 10. Device 6 112 generates and transmits re-synchronization alert signal 1102 indicating that devices in its network receiving the re-synchronization alert signal 1102 should perform a network timing re-synchronization operation. A dedicated communications resource in the timing/frequency structure being used for network A 502' is used to carry the re-synchronization alert signal. The dedicated communications resource is a resource dedicated to communications network re-synchronization alert signals. The other devices (device 1 102, device 2 104, device 3 106, device 4 108, device 5 110) in network A 502', when not transmitting a re-synchronization alert signal, monitor the dedicated resource to detect for re-synchronization alert signals from other devices. Devices (device 1 102, device 2 104, device 3 106, device 4 108 and device 5 110) receive re-synchronization alert signal 1102, and then refrain from further transmissions while monitoring for a timing synchronization signal, e.g., during a predetermined timing window following the re-synchronization alert signal.

Figure 12:
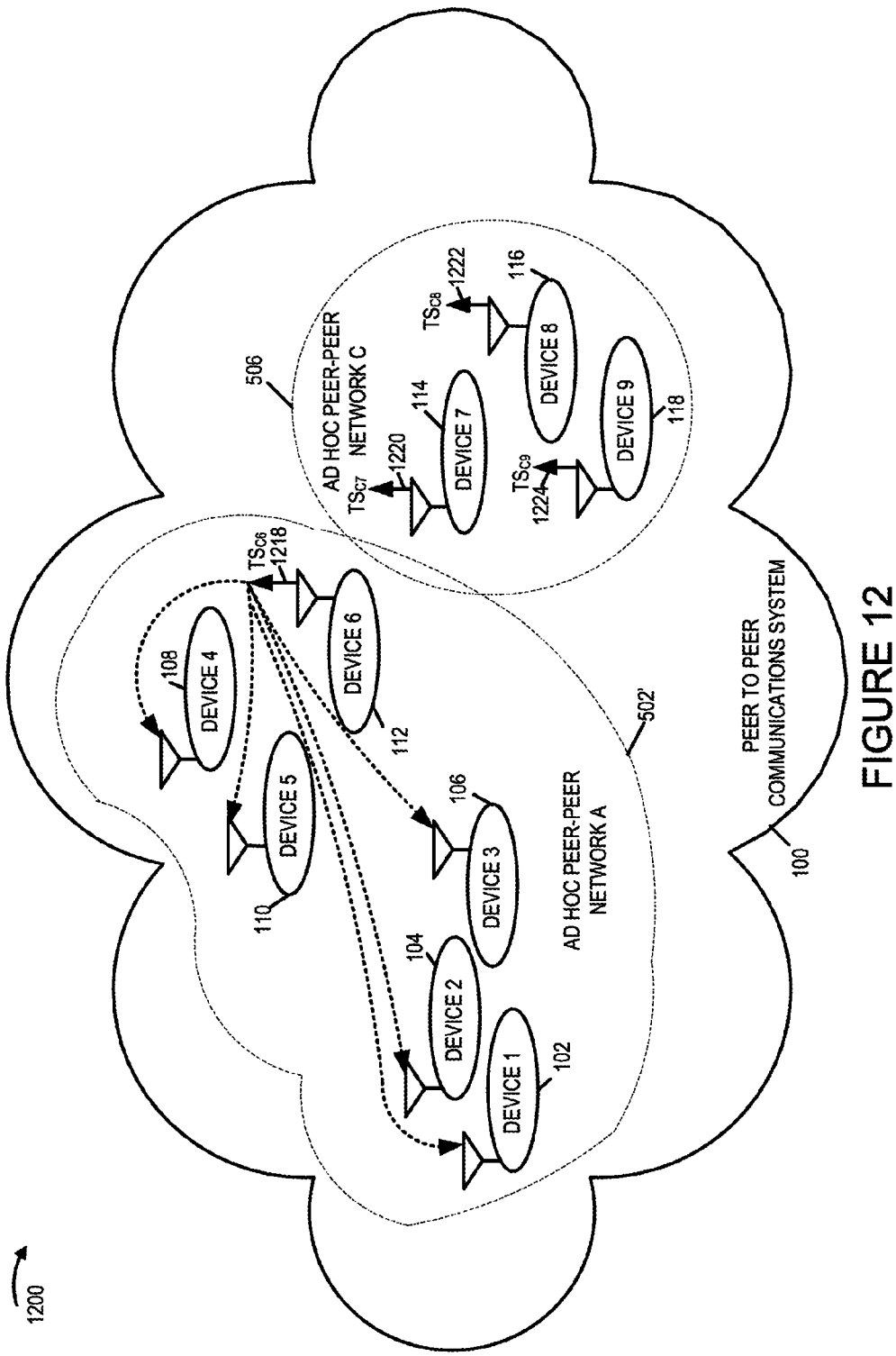
FIG. 12 is a drawing illustrating an example, in which a device in enlarged network A, which has previously transmitted a timing synchronization alert signal, transmits a timing synchronization signal to propagate the timing synchronization information pertaining to network C to other devices of enlarged network A.

Drawing 1200 of FIG. 12 illustrates exemplary system 100 during a subsequent time period with respect to FIG. 11. Device 6 112 generates and transmits timing synchronization signal TS$_{C6}$ 1218 which is received by device 1 102, device 2 104, device 3 106, device 4 108 and device 5 110. Timing synchronization signal TS$_{C6}$ 1218 is in accordance with the timing structure and synchronization of network C 506. Device 1 102, device 2 104, device 3 106, device 4 108 and device 5 110 update their timing based on the received timing synchronization signal TS$_{C6}$ 1218, e.g., synchronizing with respect to the timing structure and synchronization being followed by network C 506. In accordance with the timing structure and synchronization of network C 506, devices (device 7 114, device 8 116, device 9 118), generate and transmit timing synchronization signals (TS$_{C7}$ 1220, TS$_{C8}$ 1222, TS$_{C9}$ 1224), respectively.

Figure 13:
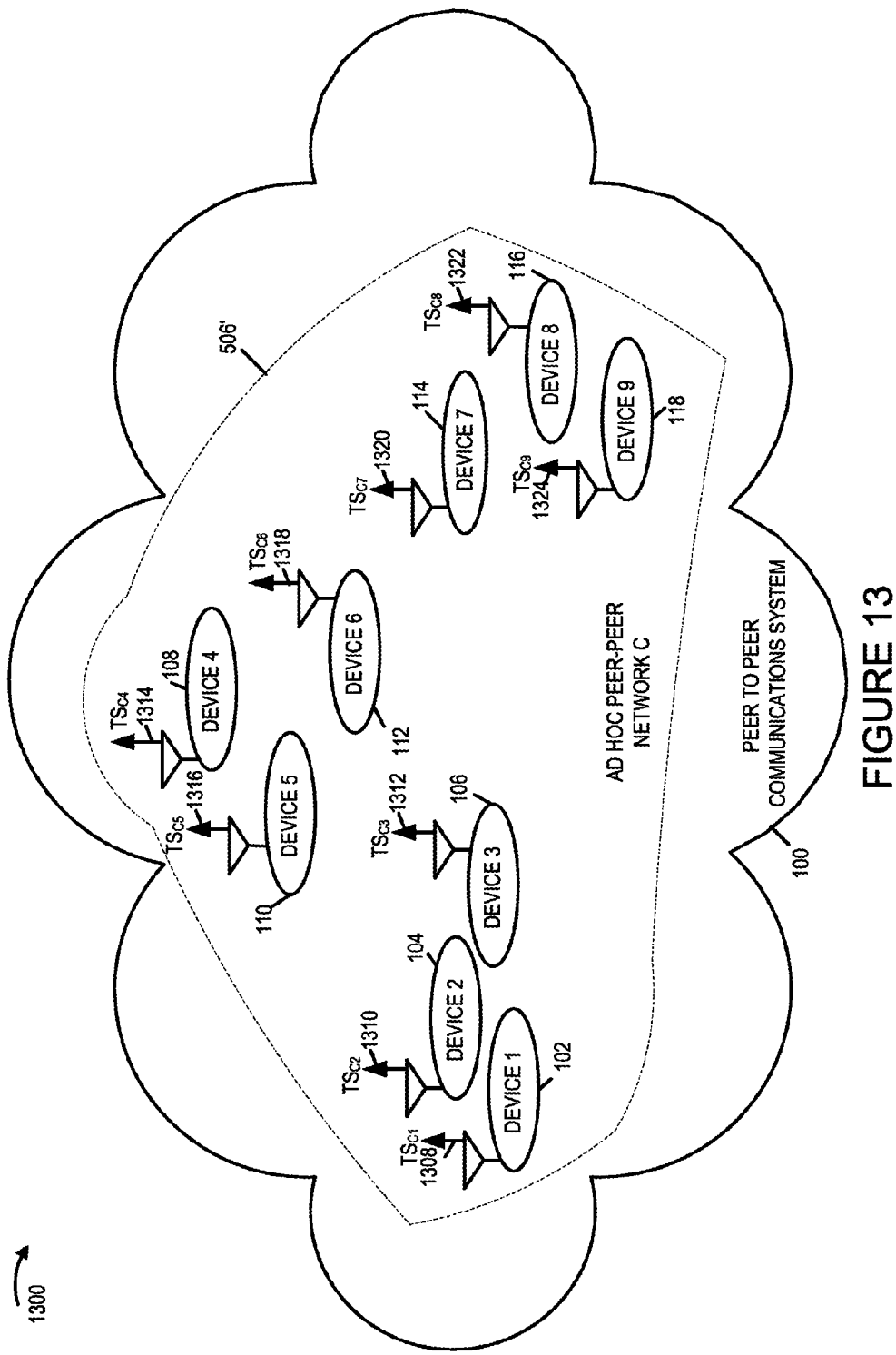
FIG. 13 is a drawing which illustrates that the devices which previously belonged to enlarged network A have updated their timing and synchronized with respect to the network C timing, and have returned to normal network peer to peer communications using the updated timing.

Drawing 1300 of FIG. 13 illustrates exemplary system 100 during a subsequent time period with respect to FIG. 12. Device 1 102, device 2 104, device 3 106, device 4 108 and device 5 110, which have updated their timing, have returned to normal network communications operation using the updated wireless communications device timing. Thus ad hoc peer to peer network A 502' has merged with ad hoc peer to peer network C 506 to form ad hoc peer to peer network C 506'. In accordance with the timing structure and synchronization of network C 506', devices (device 1 102, device 2 104, device 3 106, device 4 108, device 5 110, device 6 112, device 7 114, device 8 116, device 9 118), generate and transmit timing synchronization signals ($TS_{C1}$ 1308, $TS_{C2}$ 1310, $TS_{C3}$ 1312, $TS_{C4}$ 1314, $TS_{C5}$ 1316, $TS_{C6}$ 1318, $TS_{C7}$ 1320, $TS_{C8}$ 1322, $TS_{C9}$ 1324), respectively.

FIG. 14 is a drawing illustrating three exemplary recurring timing-frequency structures that may be used by three exemplary peer to peer ad hoc networks in a peer to peer wireless communications system. The three exemplary recurring timing-frequency structures may, e.g., correspond to the three ad hoc peer to peer networks (502, 504, 506) of FIG. 5.

Drawing 1402 of FIG. 14 is a plot of an exemplary ad hoc network A recurring timing-frequency structure. Drawing 1402 includes a vertical axis 1408 representing frequency and a horizontal axis 1410 representing time. Exemplary ad hoc network A timing-frequency structure 1402 includes synchronization resources 1412, other peer to peer resources 1414, and dedicated re-synchronization alert signal resources 1416. The synchronization resources 1412 are used to convey timing synchronization signals pertaining to ad hoc network A such as, e.g., $TS_{A1}$ 508, $TS_{A2}$ 510, $TS_{A3}$ 512 of FIG. 5. The other peer to peer resources 1414 are used to convey peer to peer paging signals, peer to peer connection establishment signals, peer to peer traffic control signals, and/or peer to peer data traffic signals pertaining to network A. In addition portions of the other peer to peer resources 1414 may go unused at times, e.g., when peer to peer traffic loading is low and the devices participating in ad hoc network A decide to go into a sleep state. Note that some devices in network A may be in a sleep state while other devices in network A may be communicating peer to peer traffic signals. The dedicated re-synchronization alert signaling resources 1416 are used to carry re-synchronization alert signals intended to be communicated to devices in network A, e.g. re-synchronization alert signal 1102 of FIG. 11.

Drawing 1404 of FIG. 14 is plot of an exemplary ad hoc network B recurring timing-frequency structure. Drawing 1404 includes a vertical axis 1408 representing frequency and a horizontal axis 1410 representing time. Exemplary ad hoc network B timing-frequency structure 1404 includes synchronization resources 1418, other peer to peer resources 1420, and dedicated re-synchronization alert signal resources 1422. The synchronization resources 1418 are used to convey timing synchronization signals pertaining to ad hoc network B such as, e.g., $TS_{B4}$ 514, $TS_{B5}$ 516, $TS_{B6}$ 518 of FIG. 5. The other peer to peer resources 1420 are used to convey peer to peer paging signals, peer to peer connection establishment signals, peer to peer traffic control signals, and/or peer to peer data traffic signals pertaining to network B. In addition portions of the other peer to peer resources 1420 may go unused at times, e.g., when peer to peer traffic loading is low and the devices participating in ad hoc network B decide to go into a sleep state. Note that some devices in network B may be in a sleep state while other devices in network B may be communicating peer to peer traffic signals. The dedicated re-synchronization alert signaling resources 1422 are used to carry re-synchronization alert signals intended to be communicated to devices in network B, e.g., re-synchronization alert signal 702 of FIG. 7.

Drawing 1406 of FIG. 14 is a plot of an exemplary ad hoc network C recurring timing-frequency structure. Drawing 1406 includes a vertical axis 1408 representing frequency and a horizontal axis 1410 representing time. Exemplary ad hoc network C timing-frequency structure 1406 includes synchronization resources 1424, other peer to peer resources 1426, and dedicated re-synchronization alert signal resources 1428. The synchronization resources 1424 are used to convey timing synchronization signals pertaining to ad hoc network C such as, e.g., $TS_{C7}$ 520, $TS_{C8}$ 522, $TS_{C9}$ 524 of FIG. 5. The other peer to peer resources 1426 are used to convey peer to peer paging signals, peer to peer connection establishment signals, peer to peer traffic control signals, and/or peer to peer data traffic signals pertaining to network C. In addition portions of the other peer to peer resources 1426 may go unused at times, e.g., when peer to peer traffic loading is low and the devices participating in ad hoc network C decide to go into a sleep state. Note that some devices in network C may be in a sleep state while other devices in network C may be communicating peer to peer traffic signals. The dedicated re-synchronization alert signaling resources 1428 are used to carry re-synchronization alert signals intended to be communicated to devices in network C.

The timing structures of the three ad hoc exemplary networks may be unsynchronized with respect to one another, e.g., there is no global timing source being used to coordinate and/or maintain timing synchronization between the three networks. In some embodiments, the time period for one iteration of a recurring timing structure in one network may be, and sometimes is, different from the time period of one iteration of a recurring timing structure in another network.

In various embodiments, the window for transmitting a timing synchronization signal following transmission of a re-synchronization alert signal and the window for monitoring for such a signal is selected in accordance with the timing structures being used by other ad hoc peer to peer networks. If each of the peer to peer networks have the same time period for one iteration of the recurring structure, the window, in some embodiments, is slightly larger than one iteration of the recurring structure.

In various embodiments, the dedicated re-synchronization alert resource in a timing-frequency recurring structure occupies a very small portion of the total air link resources in the timing-frequency structure. In some embodiments, the dedicated re-synchronization alert resource occupies less than 1% of the total resources. In some embodiments, the dedicated re-synchronization alert resource occupies less than 0.1% of the total resources. In some embodiments, the dedicated re-synchronization alert resource occupies less than 0.01% of the total resources. In some embodiments, the dedicated re-synchronization alert resource occupies at most two symbols. In some embodiments, the dedicated re-synchronization alert resource occurs during a time period equal to or less than two subsequent symbol transmission time periods. In some embodiments, the re-synchronization alert signal occupies a small number of OFDM tone-symbols, e.g., 10 or less OFDM tone-symbols. In some embodiments, the re-synchronization alert signal occupies two OFDM tone-symbols. In some embodiments, the re-synchronization alert signal occupies a single OFDM tone-symbol.

Various aspects and/or features of some, but not necessarily all embodiments, will be described below. In some embodiments, each device, e.g., each wireless communications device supporting peer to peer communications, periodically broadcasts a timing signal indicating its own notion of time. This is sometimes referred to as its own timing synchronization signal. In addition, each device will stay silent for a certain amount of time during a pre-determined time period. The time slot that each device will be silent is determined, e.g., according to a pre-defined deterministic or random rule. The purpose of this silence time slot is to enable a device to detect timing signals from other devices. In some embodiments, when a device detects a timing signal that indicates the existence of another device operating on an earlier time, it will synchronize to that device by shifting its own time.

When two groups of devices operating on different notions of time move close to each other, some devices belonging to different groups may be able to detect signals from each other. It would be beneficial if the two groups of devices could agree on a common time. The above described approach of a single device individually synchronizing with respect to another single device can eventually achieve this purpose, but this approach may cause a long delay before each of the devices can agree on the common time due to the different silence slots of different devices. To facilitate a fast agreement, in accordance with a feature of some embodiments, when a device detecting an earlier timing signal decides to shift its own time, it will broadcast a re-synchronization alert signal, at a predetermined time slot to indicate to other devices in its group to start a silent period and start to listen to timing signals. Thus each of the other devices in its group can detect the earlier timing signal during this silent period and can shift to this earlier time immediately.

In another embodiment, a device which detects another timing signal with later timing can also use a re-synchronization alert signal to inform the other group to immediately get into the silence period. In this case, it should be noted that the device should send a re-synchronization alert signal in the re-synchronization alert time period of the second group users which is currently using a later time clock.

One exemplary approach in accordance with some, but not necessarily all embodiments, will be described. A first mobile device transmits a re-synchronization alert signal in a common random-access time-slot dedicated for the purpose of carrying the re-synchronization alert signal, which may be used by any of the mobiles that decide to cause a network re-synchronization. In some embodiments, the re-synchronization alert signal includes information indicating a first time slot where it intends to transmit the timing signal corresponding to the new synchronization timing. In some other embodiments, the re-synchronization alert signal does not communicate information indicating a first time slot where it intends to transmit the timing signal corresponding to the new synchronization timing. Then the first mobile device transmits its timing signal in the first time slot.

A second mobile device listens to the common random-access time slot, which is dedicated to carrying re-synchronization alert signals. If the second mobile detects the re-synchronization alert signal, it further listens for a subsequent timing signal. In some embodiments, the second mobile listens to each of the other timing time slots, e.g., since it does not know where to expect the timing signal. In some embodiments, the re-synchronization alert signal communicates information identifying time slots in which the second mobile should listen for the timing signal, so the second mobile need only monitor a select set of timing slots. Consider that the second mobile receives the timing signal. Then the second mobile re-synchronizes its internal timing in accordance with the received timing signal.

However, if the second mobile does not detect a re-synchronization alert signal, it continues with normal operation using its current notion of timing.

The techniques of various embodiments may be implemented using software, hardware and/or a combination of software and hardware. Various embodiments are directed to apparatus, e.g., mobile nodes such as mobile terminals, base stations, communications system. Various embodiments are also directed to methods, e.g., method of controlling and/or operating mobile nodes, base stations and/or communications systems, e.g., hosts. Various embodiments are also directed to machine, e.g., computer, readable medium, e.g., ROM, RAM, CDs, hard discs, etc., which include machine readable instructions for controlling a machine to implement one or more steps of a method.

It is understood that the specific order or hierarchy of steps in the processes disclosed is an example of exemplary approaches. Based upon design preferences, it is understood that the specific order or hierarchy of steps in the processes may be rearranged while remaining within the scope of the present disclosure. The accompanying method claims present elements of the various steps in a sample order, and are not meant to be limited to the specific order or hierarchy presented.

In various embodiments nodes described herein are implemented using one or more modules to perform the steps corresponding to one or more methods, for example, signal processing, signal generation and/or transmission steps. Thus, in some embodiments various features are implemented using modules. Such modules may be implemented using software, hardware or a combination of software and hardware. Many of the above described methods or method steps can be implemented using machine executable instructions, such as software, included in a machine readable medium such as a memory device, e.g., RAM, floppy disk, etc. to control a machine, e.g., general purpose computer with or without additional hardware, to implement all or portions of the above described methods, e.g., in one or more nodes. Accordingly, among other things, various embodiments are directed to a machine-readable medium including machine executable instructions for causing a machine, e.g., processor and associated hardware, to perform one or more of the steps of the above-described method(s). Some embodiments are directed to a device, e.g., communications node, including a processor configured to implement one, multiple or all of the steps of one or more methods of the invention.

In some embodiments, the processor or processors, e.g., CPUs, of one or more devices, e.g., communications nodes such as access nodes and/or wireless terminals, are configured to perform the steps of the methods described as being performed by the communications nodes. The configuration of the processor may be achieved by using one or more modules, e.g., software modules, to control processor configuration and/or by including hardware in the processor, e.g., hardware modules, to perform the recited steps and/or control processor configuration. Accordingly, some but not all embodiments are directed to a device, e.g., communications node, with a processor which includes a module corresponding to each of the steps of the various described methods performed by the device in which the processor is included. In some but not all embodiments a device, e.g., communications node, includes a module corresponding to each of the steps of the various described methods performed by the device in which the processor is included. The modules may be implemented using software and/or hardware.

Some embodiments are directed to a computer program product comprising a computer-readable medium comprising code for causing a computer, or multiple computers, to implement various functions, steps, acts and/or operations, e.g. one or more steps described above. Depending on the embodiment, the computer program product can, and sometimes does, include different code for each step to be performed. Thus, the computer program product may, and sometimes does, include code for each individual step of a method, e.g., a method of controlling a communications device or node. The code may be in the form of machine, e.g., computer, executable instructions stored on a computer-readable medium such as a RAM (Random Access Memory), ROM (Read Only Memory) or other type of storage device. In addition to being directed to a computer program product, some embodiments are directed to a processor configured to implement one or more of the various functions, steps, acts and/or operations of one or more methods described above. Accordingly, some embodiments are directed to a processor, e.g., CPU, configured to implement some or all of the steps of the methods described herein. The processor may be for use in, e.g., a communications device or other device described in the present application.

While described in the context of an OFDM system, at least some of the methods and apparatus of various embodiments are applicable to a wide range of communications systems including many non-OFDM and/or non-cellular systems.

Numerous additional variations on the methods and apparatus of the various embodiments described above will be apparent to those skilled in the art in view of the above description. Such variations are to be considered within the scope. The methods and apparatus may be, and in various embodiments are, used with CDMA, orthogonal frequency division multiplexing (OFDM), and/or various other types of communications techniques which may be used to provide wireless communications links between communications devices. In some embodiments one or more communications devices are implemented as access points which establish communications links with mobile nodes using OFDM and/or CDMA and/or may provide connectivity to the internet or another network via a wired or wireless communications link. In various embodiments the mobile nodes are implemented as notebook computers, personal data assistants (PDAs), or other portable devices including receiver/transmitter circuits and logic and/or routines, for implementing the methods.

What is claimed is:

1. A method of operating a wireless communications device, the method comprising:
    determining that a peer to peer network timing re-synchronization is to be performed as part of a network merging operation;
    transmitting a re-synchronization alert signal indicating that devices receiving the re-synchronization alert signal should perform a network timing re-synchronization operation, said re-synchronization alert signal being transmitted using a recurring dedicated communications resource, said recurring dedicated communications resource being dedicated to communicating network re-synchronization alert signals and being a dedicated communications resource in a recurring time and frequency structure; and
    operating said wireless communications device to monitor said recurring dedicated communications resource for a network re-synchronization signal transmitted by another device when not using said dedicated communications resource to transmit said network re-synchronization signal.

2. The method of claim 1,
    wherein said recurring dedicated communications resource occurs during a time period equal to or less than two symbol transmission time periods in duration.

3. The method of claim 1, further comprising:
    transmitting a timing synchronization signal following transmission of said re-synchronization alert signal.

4. The method of claim 3,
    wherein said wireless communications device is synchronized to the timing of a first ad hoc communications network and is within timing synchronization signal range of a second ad hoc communications network, said timing synchronization signal propagating timing information from the second ad hoc communications network to the first ad hoc communications network.

5. The method of claim 3,
    wherein said recurring dedicated communications resource includes less than 10 or less OFDM tone-symbols in a recurring time and frequency structure; and
    wherein said wireless communications device is synchronized to the timing of a first ad hoc communications network and is within timing synchronization signal range of a second ad hoc communications network, said timing synchronization signal propagating timing information from the first ad hoc communications network to the second ad hoc communications network.

6. The method of claim 1, further comprising:
    receiving a re-synchronization alert signal transmitted by another wireless communications device;
    refraining from further transmissions until a timing synchronization signal is received; and
    updating first ad hoc communications network wireless communications device timing based on the received timing synchronization signal.

7. The method of claim 6 further comprising:
    returning to normal network communication operation using said updated wireless communications device timing.

8. A wireless communications device comprising:
    means for determining that a peer to peer network timing re-synchronization is to be performed as part of a network merging operation;
    means for transmitting a re-synchronization alert signal indicating that devices receiving the re-synchronization alert signal should perform a network timing re-synchronization operation, said means for transmitting said re-synchronization alert signal including means for using a recurring dedicated communications resource, said recurring dedicated communications resource being dedicated for communication of network re-synchronization alert signals and being a dedicated communications resource in a recurring time and frequency structure; and
    means for monitoring said recurring dedicated communications resource for a network re-synchronization signal transmitted by another device, said means for monitoring performing monitoring when said wireless communications device is not using said dedicated communications resource to transmit said network re-synchronization signal.

9. The wireless communications device of claim 8,
    wherein said recurring dedicated communications resource occurs during a time period equal to or less than two symbol transmission time periods in duration.

10. The wireless communications device of claim 8, further comprising:
    means for transmitting a timing synchronization signal following transmission of said re-synchronization alert signal.

11. The wireless communications device of claim 10, wherein said wireless communications device is synchronized to the timing of a first ad hoc communications network and is within timing synchronization signal range of a second ad hoc communications network, said timing synchronization signal propagating timing information from the second ad hoc communications network to the first ad hoc communications network.

12. The wireless communications device of claim 10, wherein said wireless communications device is synchronized to the timing of a first ad hoc communications network and is within timing synchronization signal range of a second ad hoc communications network, said timing synchronization signal propagating timing information from the first ad hoc communications network to the second ad hoc communications network.

13. The wireless communications device of claim 8, further comprising:
wherein said means for monitoring are also for receiving a re-synchronization alert signal transmitted by another wireless communications device;
means for refraining from further transmissions until a timing synchronization signal is received; and
means for updating first ad hoc communications network wireless communications device timing based on the received timing synchronization signal.

14. The wireless communications device of claim 13 further comprising:
means for returning to normal network communication operation using said updated wireless communications device timing.

15. A computer program product for use in a wireless communications device, the computer program product comprising:
a non-transitory computer readable medium comprising:
code for causing at least one computer to determine that a peer to peer network timing re-synchronization is to be performed as part of a network merging operation;
code for causing said at least one computer to transmit a re-synchronization alert signal indicating that devices receiving the re-synchronization alert signal should perform a network timing re-synchronization operation, said code for causing said at least one computer to transmit the re-synchronization alert signal including code for causing said at least one computer to transmit said re-synchronization alert signal using a recurring dedicated communications resource, said recurring dedicated communications resource being dedicated to communicating network re-synchronization alert signals and being a dedicated communications resource in a recurring time and frequency structure; and
code for causing said at least one computer to monitor said recurring dedicated communications resource for a network re-synchronization signal transmitted by another device when said wireless communications device is not using said dedicated communications resource to transmit said network re-synchronization signal.

16. A wireless communications device comprising:
at least one processor configured to:
determine that a peer to peer network timing re-synchronization is to be performed as part of a network merging operation; and
transmit a re-synchronization alert signal indicating that devices receiving the re-synchronization alert signal should perform a network timing re-synchronization operation, said at least one processor being configured to use a recurring dedicated communications resource to transmit said re-synchronization alert signal, said recurring dedicated communications resource being dedicated to communicating network re-synchronization alert signals and being a dedicated communications resource in a recurring time and frequency structure; and
monitor said recurring dedicated communications resource for a network re-synchronization signal transmitted by another device when not using said dedicated communications resource to transmit said network re-synchronization signal; and
memory coupled to said at least one processor.

17. The wireless communications device of claim 16, wherein said recurring dedicated communications resource occurs during a time period equal to or less than two symbol transmission time periods in duration.

18. The wireless communications device of claim 16, wherein said at least one processor is further configured to:
transmit a timing synchronization signal following transmission of said re-synchronization alert signal.

19. The wireless communications device of claim 18, wherein said wireless communications device is synchronized to the timing of a first ad hoc communications network and is within timing synchronization signal range of a second ad hoc communications network, said timing synchronization signal propagating timing information from the second ad hoc communications network to the first ad hoc communications network.

20. The wireless communications device of claim 18, wherein said wireless communications device is synchronized to the timing of a first ad hoc communications network and is within timing synchronization signal range of a second ad hoc communications network, said timing synchronization signal propagating timing information from the first ad hoc communications network to the second ad hoc communications network.

21. The method of claim 1, wherein said timing synchronization signal is transmitted within a predetermined timing window following transmitting of said re-synchronization alert signal.

22. The wireless communications device of claim 8, wherein said means for transmitting a timing synchronization signal includes means for controlling a timing synchronization signal to be transmitted within a predetermined timing window following transmitting of said re-synchronization alert signal.

23. The computer program product of claim 15, wherein said computer readable medium further comprises code for causing said at least one computer to transmit said timing synchronization signal within a predetermined timing window following transmitting of said re-synchronization alert signal.

24. The wireless communications device of claim 16, wherein said at least one processor is further configured to control said timing synchronization signal transmission to be within a predetermined timing window following transmitting of said re-synchronization alert signal.

* * * * *